US006163803A

United States Patent [19]

Watanabe

[11] Patent Number: 6,163,803

[45] Date of Patent: Dec. 19, 2000

[54] TRANSMITTING APPARATUS, RECEIVING APPARATUS, RECORDING APPARATUS, AND REPRODUCING APPARATUS

[75] Inventor: Koichiro Watanabe, Saitama, Japan

[73] Assignee: Sony Corporation, Tokyo, Japan

[21] Appl. No.: 09/168,316

[22] Filed: Oct. 7, 1998

[30] Foreign Application Priority Data

Oct. 8, 1997 [JP] Japan .................................... 9-275847

[51] Int. Cl.[7] ...................................................... G06F 15/16

[52] U.S. Cl. ............................ 709/217; 709/219; 455/5.1

[58] Field of Search .................................... 348/12, 13, 7; 455/4.2, 5.1; 345/327; 709/217–219; H04N 7/173

[56] References Cited

U.S. PATENT DOCUMENTS 5,761,606 6/1998 Wolzien .................................. 455/6.2

*Primary Examiner*—Nathan Flynn

*Attorney, Agent, or Firm*—Frommer Lawrence & Haug, LLP; William S. Frommer; Bruno Polito

[57] ABSTRACT

A URL input unit 101 supplies a URL to be transmitted to an encoder 102. A keyboard can be mentioned as a typical URL input unit. The encoder 102 supplies an encoded audio URL signal to an audio signal multiplexer 103 on the basis of the URL from the URL input unit 101. The audio signal multiplexer 103 multiplexes the audio URL signal supplied from the encoder 102 to an audio signal which is supplied from an input terminal and supplies a multiplexed signal to an audio signal transmitter 104. The audio signal transmitter 104 transmits the signal through a transmitting antenna 105. The audio URL signal and the audio signal from the input terminal are switched at a proper timing in accordance with a predetermined rule and either one of them is transmitted.

41 Claims, 14 Drawing Sheets

TRANSMITTING APPARATUS, RECEIVING APPARATUS, RECORDING APPARATUS, AND REPRODUCING APPARATUS

BACKGROUND OF THE INVENTION

1. Field of the Invention

The invention relates to an audio URL signal transmitting apparatus in which an audio signal is used as a medium, an audio URL signal receiving apparatus, a television transmitting apparatus, a television receiving apparatus, an audio URL signal recording apparatus, an audio URL signal reproducing apparatus, an optical disk recording apparatus, and an optical disk reproducing apparatus.

2. Description of the Related Art

Hitherto, in case of accessing to a web site of a URL (Uniform Resource Locator) broadcasted by a television broadcasting, the viewer needs to once write the URL and to input it to an information processing apparatus having a web browser function such as home-use personal computer or internet TV.

Or, in case of accessing to a web site shown by a URL existing in a video signal reproduced from a package media such as an optical disk or the like, the viewer needs to once write the URL and to input it to an information processing apparatus having the web browser function such as home-use personal computer or internet TV.

Those methods, however, are very inconvenient.

OBJECTS AND SUMMARY OF THE INVENTION

In consideration of the above points, it is an object of the invention to provide an audio URL signal transmitting and receiving system comprising: an audio URL signal transmitting apparatus and a television transmitting apparatus for transmitting a URL as an audio signal in order to make it easy to access to a web site; and an audio URL signal receiving apparatus and a television receiving apparatus for, when the URL is extracted from the received audio signal, automatically accessing to the web site shown by the URL and obtaining web information and outputting the web information.

Another object of the invention is to provide an audio URL signal recording and reproducing system comprising: an audio URL signal recording apparatus and an optical disk recording apparatus for recording a URL as an audio signal in order to make it easy to access to a web site; and an audio URL signal reproducing apparatus and an optical disk reproducing apparatus for, when the URL is extracted from the reproduced audio signal, automatically accessing to the web site shown by the URL and obtaining web information and outputting the web information.

According to the invention disclosed in claim 1, there is provided an audio URL signal transmitting apparatus comprising: URL input means for deciding a URL to be transmitted; an encoder for outputting an audio URL signal on the basis of the URL which is supplied from the URL input means; audio signal switching means for switching the audio URL signal which is supplied from the encoder and an audio signal which is supplied from an outside and outputting either one of them; audio signal transmitting means for modulating the audio signal which is supplied from the audio signal switching means; and a transmitting antenna for supplying the modulated audio signal.

According to the invention disclosed in Claim 2, there is provided an audio URL signal transmitting apparatus comprising: URL input means for deciding a URL to be transmitted; an encoder for outputting an audio URL signal on the basis of the URL which is supplied from the URL input means; audio signal multiplexing means for multiplexing the audio URL signal which is supplied from the encoder to an audio signal which is supplied from an outside and outputting a multiplexed signal; audio signal transmitting means for modulating the audio signal which is supplied from the audio signal multiplexing means; and a transmitting antenna for supplying the modulated audio signal.

According to the invention disclosed in Claim 3, there is provided an audio URL signal receiving apparatus comprising: a receiving antenna for receiving a radio wave; audio signal receiving means for demodulating an audio signal from a signal which is supplied from the receiving antenna; audio signal output means for outputting the audio signal which is supplied from the audio signal receiving means; a decoder for extracting an audio URL signal from the audio signal which is supplied from the audio signal receiving means and for uniquely deciding a URL transmitted from the extracted audio URL signal; information processing means for accessing through a network line to a web site shown by the URL which is supplied from the decoder and for outputting web information or inputting or outputting the URL to/from a predetermined storing unit; command input means for supplying a command to the information processing means; storing means for storing information which is supplied from the information processing means or reading out stored information and supplying to the information processing means by a command from the information processing means; and web information output means for outputting the web information which is supplied from the information processing means.

According to the invention disclosed in Claim 5, there is provided a television transmitting apparatus having an audio URL signal transmitting function, comprising: a keyboard for inputting a URL to be transmitted; an encoder for outputting an audio URL signal on the basis of the URL inputted from the keyboard; audio signal multiplexing means for multiplexing the audio URL signal which is supplied from the encoder to an audio signal which is supplied from an outside and outputting a multiplexed signal; audio/video signal transmitting means for modulating the audio signal which is supplied from the audio signal multiplexing means and a video signal which is supplied from the outside; and a transmitting antenna for supplying the modulated audio signal and the modulated video signal.

According to the invention disclosed in Claim 6, there is provided a television receiving apparatus having an audio URL signal receiving function, comprising: a receiving antenna for receiving a radio wave; audio/video signal receiving means for demodulating an audio signal and a video signal from a signal which is supplied from the receiving antenna; a speaker for outputting the audio signal which is supplied from the audio/video signal receiving means; video signal output means; a decoder for extracting an audio URL signal from the audio signal which is supplied from the audio/video signal receiving means and for uniquely deciding a URL transmitted from the extracted audio URL signal; information processing means for accessing through a telephone line to a web site shown by the URL which is supplied from the decoder and for outputting web information or inputting or outputting the URL to/from a predetermined storing unit; an operation key for supplying a command to the information processing means; storing means for storing information which is supplied from the information processing means or reading out stored information and supplying to the information processing means by a command from the information processing means; web information video signal converting means for converting the web information which is supplied from the information processing means to a video signal which can be outputted to the video signal output means; video signal switching means for supplying either one or both of the video signal which is supplied from the web information video signal converting means and the video signal which is supplied from the audio/video signal receiving means to the video signal output means; and a monitor for outputting the video signal which is supplied from the video signal switching means.

According to the invention disclosed in claim 17, there is provided an audio URL signal recording apparatus comprising: URL input means for deciding a URL to be transmitted; an encoder for outputting an audio URL signal on the basis of the URL which is supplied from the URL input means; audio signal multiplexing means for multiplexing the audio URL signal which is supplied from the encoder to an audio signal which is supplied from an outside and outputting a multiplexed signal; and audio signal recording means for recording the audio signal which is supplied from the audio signal multiplexing means to an audio signal recording medium.

According to the invention disclosed in claim 18, there is provided an audio URL signal reproducing apparatus comprising: audio signal reproducing means for reproducing an audio signal recorded on an audio signal recording medium by a command from information processing means; audio signal output means for outputting the audio signal which is supplied from the audio signal reproducing means; a decoder for extracting an audio URL signal from the audio signal which is supplied from the audio signal reproducing means and for uniquely deciding the URL transmitted from the extracted audio URL signal; information processing means for accessing through a network line to a web site shown by the URL which is supplied from the decoder and for outputting web information or inputting or outputting the URL to/from a predetermined storing unit or supplying a control command to the audio signal reproducing means; command input means for supplying a command to the information processing means; storing means for storing information which is supplied from the information processing means or reading out stored information and supplying to the information processing means by a command from the information processing means; and web information output means for outputting the web information which is supplied from the information processing means.

According to the invention disclosed in Claim 20, there is provided an optical disk recording apparatus having an audio URL signal recording function, comprising: a keyboard for inputting a URL to be transmitted; an encoder for outputting a URL audio signal on the basis of the URL inputted from the keyboard; audio signal multiplexing means for multiplexing the URL audio signal which is supplied from the encoder to an audio signal which is supplied from an outside and outputting a multiplexed signal; and optical disk recording means for recording the audio signal which is supplied from the audio signal multiplexing means and a video signal which is supplied from the outside onto an optical disk.

According to the invention disclosed in Claim 21, there is provided an optical disk reproducing apparatus having an audio URL signal reproducing function, comprising: optical disk reproducing means for reproducing an audio signal and a video signal from an optical disk; a speaker for outputting the audio signal which is supplied from the optical disk reproducing means; video signal output means; a decoder for extracting an audio URL signal from the audio signal which is supplied from the optical disk reproducing means and for uniquely deciding a URL transmitted from the extracted audio URL signal; information processing means for accessing through a telephone line to a web site shown by the URL which is supplied from the decoder and for outputting web information or inputting or outputting the URL to/from a predetermined storing unit or supplying a control command to the optical disk reproducing means; an operation key for supplying a command to the information processing means; storing means for storing information which is supplied from the information processing means or reading out stored information and supplying to the information processing means by a command from the information processing means; web information video signal converting means for converting web information which is supplied from the information processing means to a video signal which can be outputted to the video signal output means; video signal switching means for supplying either one or both of the video signal which is supplied from the web information video signal converting means and the video signal which is supplied from the optical disk reproducing means to the video signal output means; and a monitor for outputting the video signal which is supplied from the video signal switching means.

The URL is multiplexed to the audio signal and the resultant signal is transmitted as an audio URL signal from the transmitting antenna. In this instance, the audio URL signal can be also transmitted together with the video signal. When the transmitted audio URL signal is received, the URL which is uniquely determined from the audio URL signal is obtained by the information processing means. The web information shown by the URL is captured through the network line and the captured web information is displayed. Or, the URL obtained by the information processing means is stored into the storing unit. When a display command is inputted, the web information is captured through the network line and the captured web information is displayed. In this instance, in the case where the audio URL signal is received together with the video signal, the display contents on a monitor on which the video signal is displayed are switched from the video signal to the web information or the web information is displayed together with the video signal onto the monitor. Further, even in a case where the audio URL signal is recorded onto a recording medium and the recording medium on which the audio URL signal has been recorded is reproduced, the web information shown by the obtained URL is also similarly captured through the network line and the captured web information is displayed. Or, in the case where the obtained URL is stored into the storing unit and a display command is inputted, the web information is captured through the network line and the captured web information is displayed.

The above and other objects and features of the present invention will become apparent from the following detailed description and the appended claims with reference to the accompanying drawings.

DETAILED DESCRIPTION OF THE PREFERRED EMBODIMENTS

Figure 1:
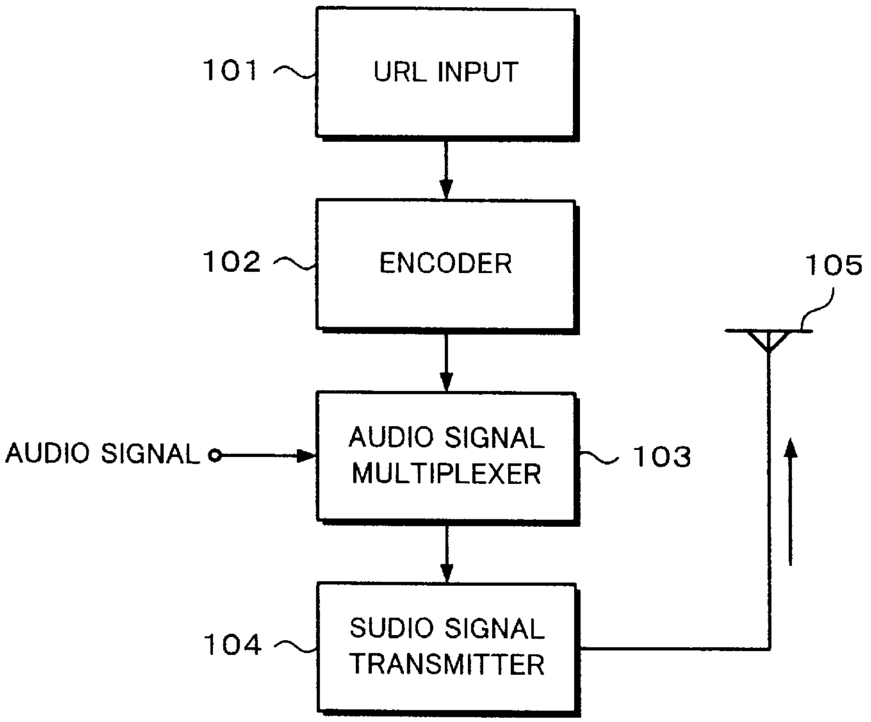
FIG. 1 is a block diagram of the first embodiment of an audio URL signal transmitting apparatus to which the invention is applied.

An embodiment of the invention will now be described hereinbelow. An audio URL signal transmitting and receiving system according to the invention is constructed by an audio URL transmitting apparatus and an audio URL receiving apparatus. The audio URL transmitting apparatus comprises: URL input means for deciding a URL to be transmitted; an encoder for outputting a URL audio signal on the basis of the URL which is supplied; an audio signal switch for switching the URL audio signal and an audio signal which are supplied and outputting either one of them; an audio signal transmitter for modulating the audio signal which is supplied; and a transmitting antenna.

Or, the audio URL transmitting apparatus comprises: URL input means for deciding a URL to be transmitted; an encoder for outputting a URL audio signal on the basis of the URL which is supplied; an audio signal multiplexer for multiplexing the URL audio signal which is supplied to an audio signal which is supplied from an outside and outputting a multiplexed signal; an audio signal transmitter for modulating the audio signal which is supplied; and a transmitting antenna.

The audio URL receiving apparatus comprises: a receiving antenna for receiving a radio wave; an audio signal receiver for demodulating an audio signal from a signal which is supplied from the receiving antenna; audio signal output means for outputting an audio signal which is supplied; a decoder for extracting an audio URL signal from the audio signal which is supplied and uniquely deciding a URL transmitted; an information processing apparatus for accessing through a network line to a web site shown by the URL which is supplied and for obtaining web information or inputting or outputting the URL to/from a storing apparatus; web information output means for outputting the web information which is supplied; the storing apparatus for writing information which is supplied from the information processing apparatus or reading out stored information and supplying to the information processing apparatus by a command from the information processing apparatus; and command input means for supplying a command to the information processing apparatus.

Further, an audio URL signal recording and reproducing system according to the invention is constructed by an audio URL recording apparatus and an audio URL reproducing apparatus. The audio URL recording apparatus comprises: URL input means for deciding a URL to be transmitted; an encoder for outputting a URL audio signal on the basis of the URL which is supplied; an audio signal multiplexer for multiplexing the URL audio signal which is supplied to an audio signal which is supplied from an outside and outputting a multiplexed signal; and an audio signal recorder for recording the audio signal which is supplied to an audio signal recording medium.

The audio URL reproducing apparatus comprises: an audio signal reproducer for reproducing an audio signal recorded on an audio signal recording medium by a command from an information processing apparatus; audio signal output means for outputting an audio signal which is supplied; a decoder for extracting an audio URL signal from the audio signal which is supplied and uniquely deciding a transmitted URL; an information processing apparatus for accessing through a network line to a web site shown by the URL which is supplied and for obtaining web information or inputting or outputting the URL to/from a storing apparatus or supplying a command to an audio signal reproducer; web information output means for outputting the web information which is supplied; the storing apparatus for writing information which is supplied from the information processing apparatus or reading out stored information and supplying to the information processing apparatus by a command from the information processing apparatus; and command input means for supplying a command to the information processing apparatus.

A preferred embodiment of an apparatus which is applied to the invention will now be described in detail with reference to the drawings. In the specification, a signal in an audible band of the human being is expressed as an audio signal. A characteristic audio signal corresponding to the URL in a one-to-one corresponding relation by a predetermined rule is expressed as an audio URL signal.

In the specification, an information server connected to the internet is expressed as a web site and information which is supplied from the web site to a client and can be provided to the user through a browser by the client is expressed as web information. As an example of the web information, text information written by a format such as an HTML (Hyper Text Markup Language) or the like, image information, or the like can be mentioned.

The audio URL transmitting and receiving system according to the invention will now be described in detail with reference to the drawings. FIG. 1 shows the first embodiment of an audio URL signal transmitting apparatus to which the invention is applied. A URL input unit 101 supplies a URL to be transmitted to an encoder 102. A keyboard can be mentioned as a typical URL input unit. On the basis of the URL from the URL input unit 101, the encoder 102 supplies an encoded audio URL signal to an audio signal multiplexer 103. The audio signal multiplexer 103 multiplexes the audio URL signal supplied from the encoder 102 to an audio signal which is supplied from an input terminal and supplies to an audio signal transmitter 104. The audio signal transmitter 104 transmits the signal through a transmitting antenna 105.

In the audio URL signal transmitting apparatus, although the audio URL signal is multiplexed to the audio signal from the input terminal, it will be obviously understood that even if the audio URL signal and the audio signal from the input terminal are switched at a proper timing and either one of them is transmitted in accordance with a predetermined rule, so long as the audio URL signal can be separated and extracted from the received audio signal, a similar effect can be obtained.

Figure 2:
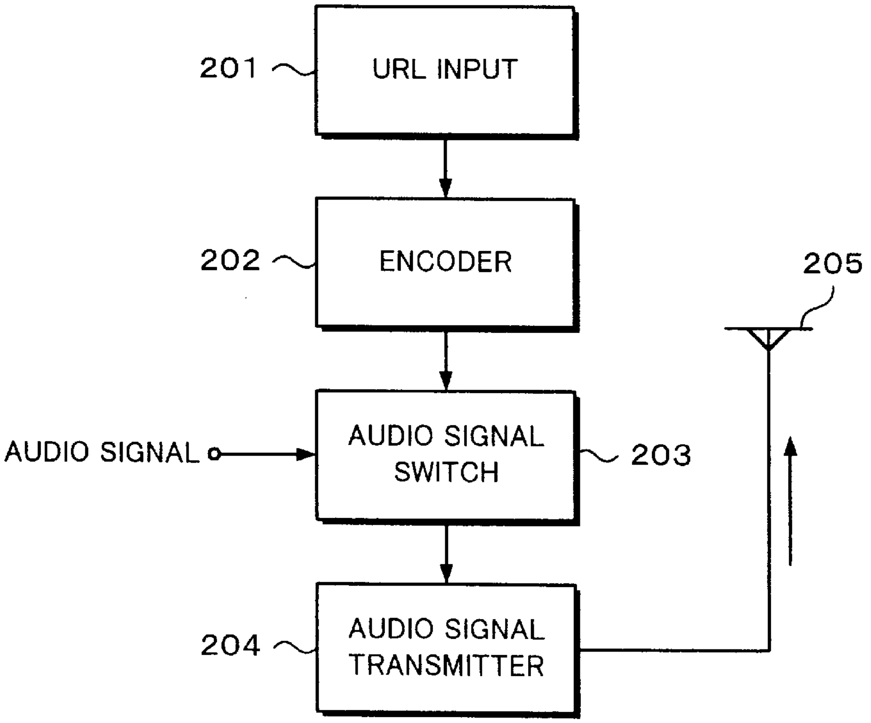
FIG. 2 is a block diagram of the second embodiment of an audio URL signal transmitting apparatus to which the invention is applied.

FIG. 2 shows the second embodiment of an audio URL signal transmitting apparatus to which the invention is applied. A URL input unit 201 supplies a URL to be transmitted to an encoder 202. On the basis of the URL from the URL input unit 201, the encoder 202 supplies an encoded audio URL signal to an audio signal switch 203. The audio signal switch 203 switches the audio URL signal supplied from the encoder 202 and an audio signal which is supplied from an input terminal at a proper timing and supplies either one of them to an audio signal transmitter 204 in accordance with a predetermined rule. The audio signal transmitter 204 transmits the signal through a transmitting antenna 205.

If a method of extremely performing the switching, in an extremely short time, that is executed by the audio signal switch 203 or a method of switching in accordance with a waveform of the inputted audio signal is used, for example, it is also possible to construct such that the audio URL signal is purposely hard to be listened to the human ears.

Figure 3:
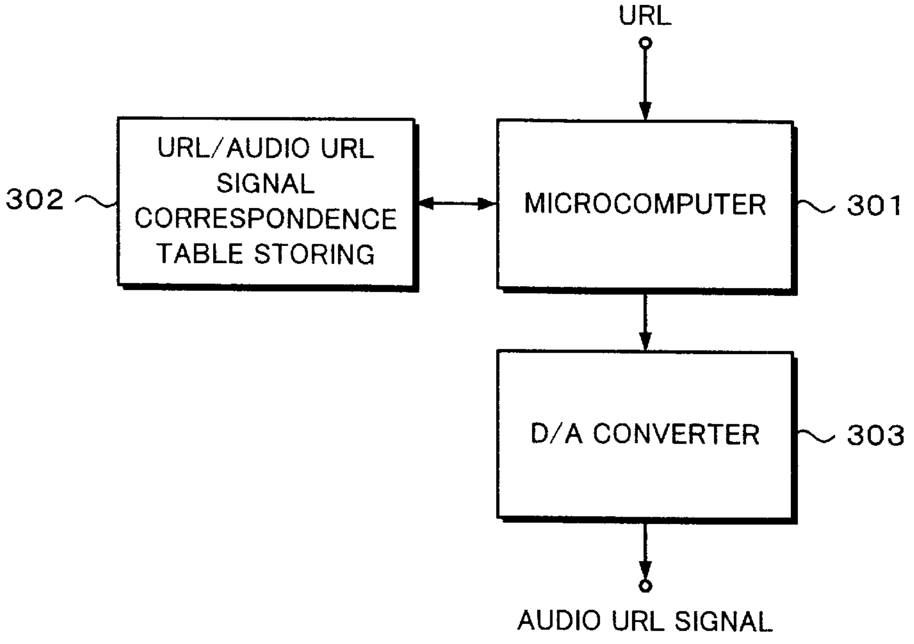
FIG. 3 is a block diagram of an example of an encoder which is applied to the invention.

FIG. 3 shows a block diagram of an example in the encoder in FIG. 1 or 2. The URL which is supplied through the input terminal is supplied to a microcomputer 301. On the basis of the supplied URL, the microcomputer 301 refers to a URL/audio URL signal correspondence table storing unit 302 and supplies information (audio URL signal which has been digitized and stored) corresponding to the supplied URL to a D/A converter 303 through the microcomputer 301. The D/A converter 303 converts the information which is supplied from the microcomputer 301 to the audio URL signal and outputs.

By combining the foregoing means, apparatus, and processing procedure, the audio URL signal transmitting apparatus for transmitting the URL as an audio URL signal can be realized.

Figure 4:
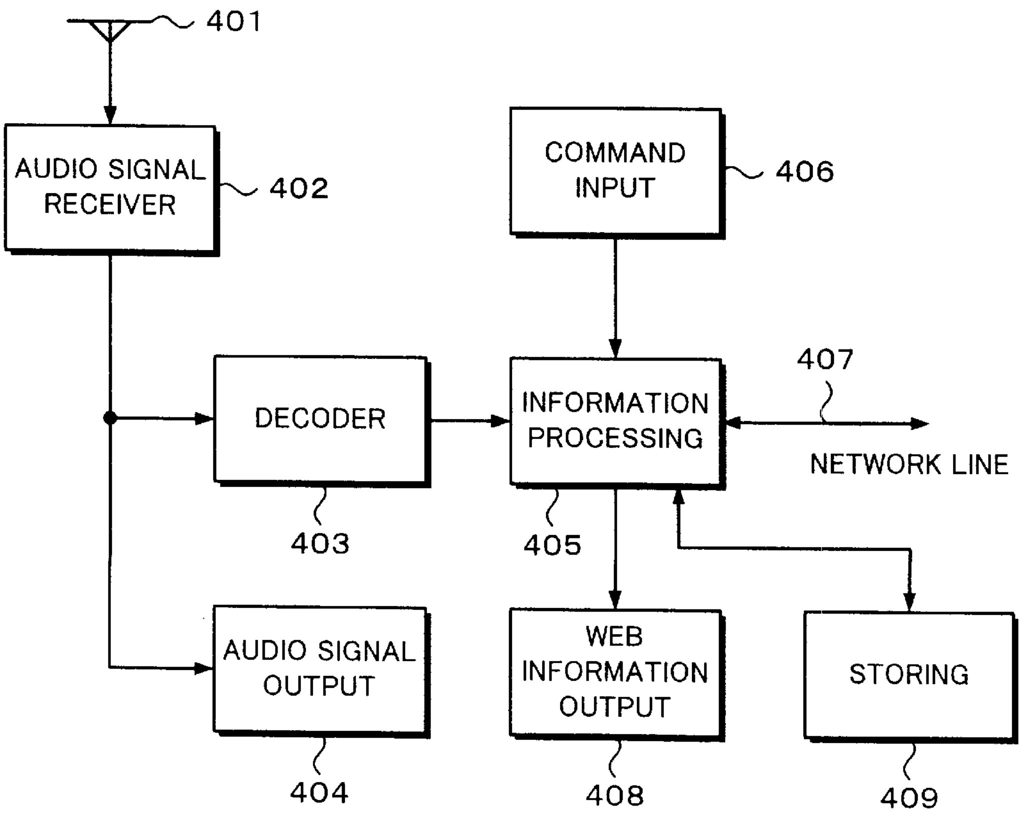
FIG. 4 is a block diagram of an embodiment of an audio URL signal receiving apparatus to which the invention is applied.

FIG. 4 shows the first embodiment of the audio URL signal receiving apparatus to which the invention is applied. An audio signal receiver 402 demodulates an audio signal from a radio wave captured by a receiving antenna 401 and supplies the demodulated audio signal to a decoder 403 and an audio signal output unit 404. The decoder 403 extracts the audio URL signal which corresponds to the URL in a one-to-one corresponding manner from the audio signal from the audio signal receiver 402, thereby deciding the transmitted URL and supplying the URL to an information processing unit 405.

The audio signal output unit 404 outputs the audio signal supplied from the audio signal receiver 402. A speaker can be mentioned as typical audio signal output means. In accordance with a predetermined procedure, the information processing unit 405 accesses through a network line 407 to a web site shown by the URL which is supplied from the decoder 403, captures web information, and supplies the web information to a web information output unit 408 in accordance with a command from a command input unit 406.

Or, the information processing unit 405 writes the URL into a storing unit 409 or reads out the URL from the storing unit 409 as necessary. A microcomputer can be mentioned as a typical information processing unit. The storing unit 409 stores the URL supplied from the information processing unit 405 or supplies the stored URL to the information processing unit 405. The command input unit 406 supplies a command to the information processing unit 405. An operator (an operation button or an operation key) can be mentioned as a typical command input unit. The web information output unit 408 outputs the web information which is supplied from the information processing unit 405. As a typical web information output unit, a monitor or an output terminal from which the web information is outputted by a predetermined protocol can be mentioned.

Figure 5:
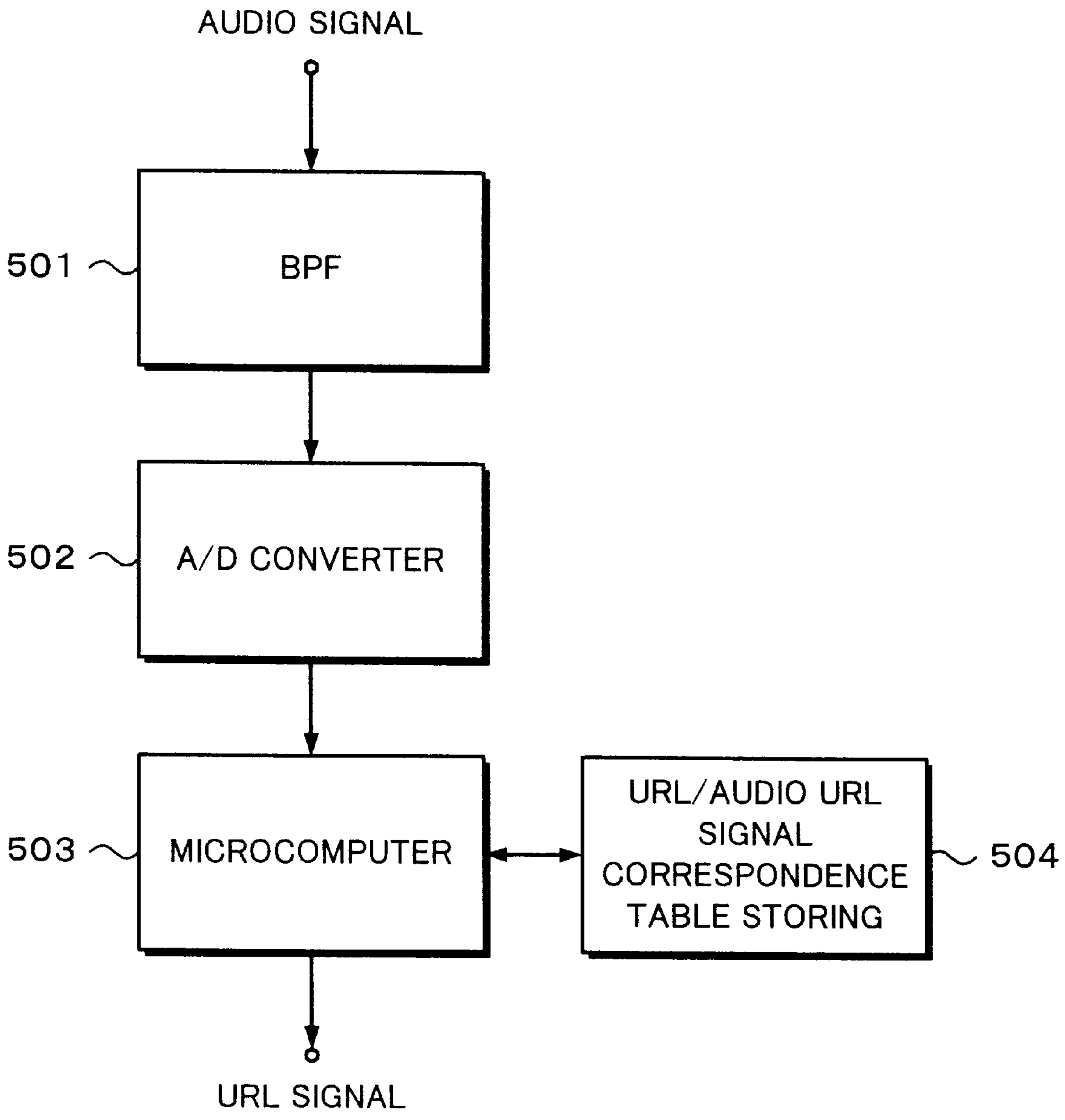
FIG. 5 is a block diagram of an example of a decoder which is applied to the invention.

FIG. 5 shows a block diagram of an example of the decoder in FIG. 4. A band pass filter (BPF) 501 extracts only a necessary audio band from the audio signal which is supplied from an input terminal and supplies to an A/D converter 502. The A/D converter 502 converts the signal which is supplied to a digital signal and supplies to a microcomputer 503. On the basis of the information supplied from the A/D converter, the microcomputer 503 refers to a URL/audio URL signal correspondence storing unit 504 and extracts the audio URL signal corresponding to the URL in a one-to-one corresponding manner, thereby deciding the transmitting URL and outputting the URL through the microcomputer 503.

Figure 6:
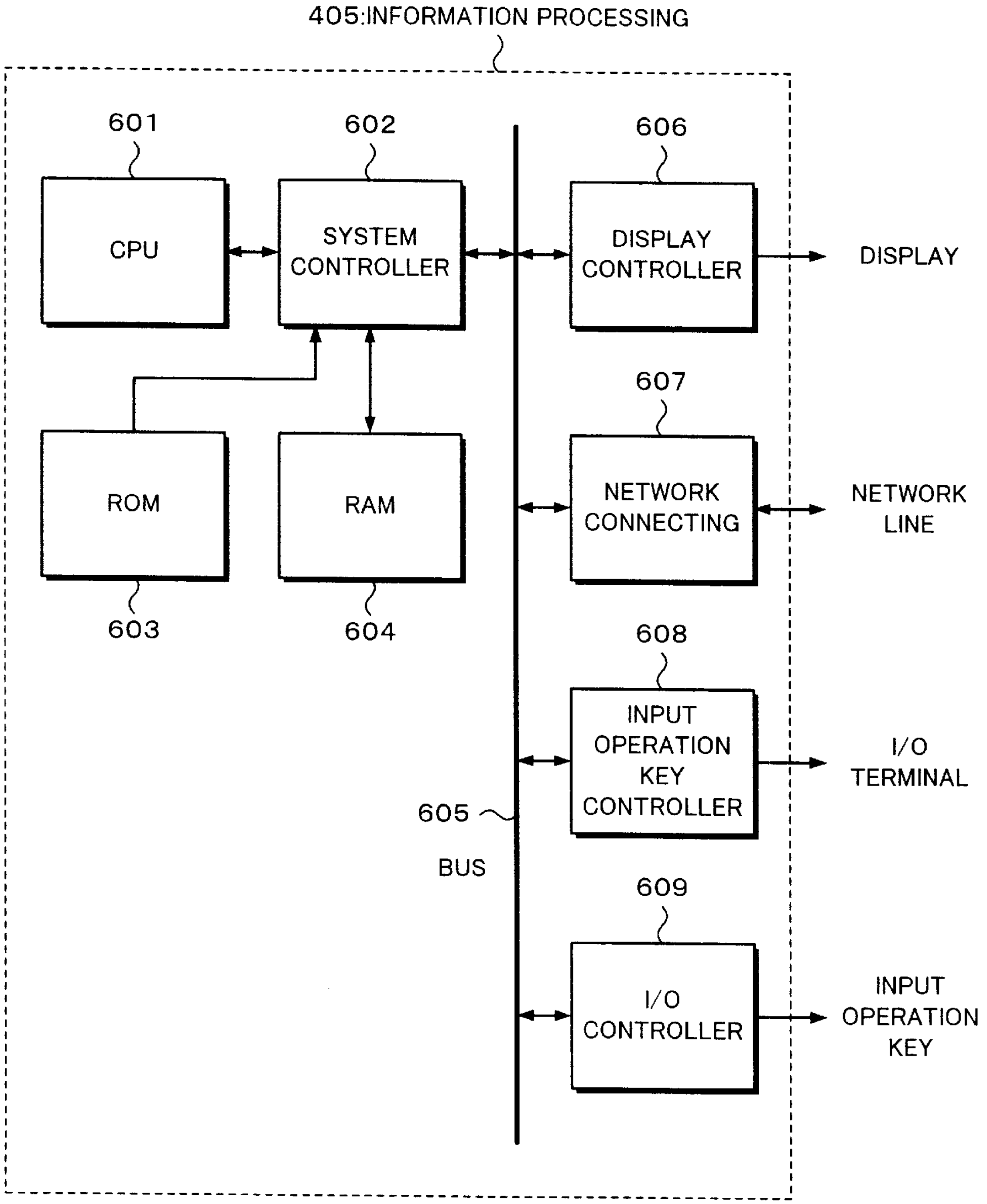
FIG. 6 is a block diagram of an example of an information processing unit which is applied to the invention.

FIG. 6 shows a block diagram of an example of the information processing unit 405 in FIG. 4. A system controller 602 is connected to a CPU 601 to perform a whole control, an arithmetic operation, or the like of the information processing unit. In the system controller 602, a timing adjustment among the CPU 601, an ROM 603, an RAM 604, and other controllers is performed. A processing procedure of the whole information processing unit has been stored in the ROM 603 and is referred by an instruction from the CPU 601 or system controller 602. Information is written or read out into/from the RAM 604 by an instruction from the CPU 601 or system controller 602.

A bus 605 to transfer information is connected to the system controller 602. A display controller 606, a network connecting unit 607, and an input operation key controller 608 or an I/O controller 609 are connected through the bus 605 to the system controller 602. Web information is outputted from the display controller 606 on the basis of an instruction from the CPU 601.

On the basis of an instruction from the CPU 601, the network connecting unit 607 modulates transmission information in accordance with a predetermined protocol and outputs to the network. Or, when a signal is inputted in accordance with a predetermined protocol, the network connecting unit 607 demodulates the signal and supplies to the CPU 601. A telephone line can be mentioned as a typical example of the network line. In this instance, the network connecting unit 607 is what is called a telephone line connecting unit. On the basis of an instruction from the CPU 601, the transmission information is modulated to an audio signal that can be transmitted by the telephone line and is outputted. Or, when an audio signal is inputted to the telephone line connecting unit, the signal is demodulated and is supplied to the CPU 601.

In the input operation key controller 608, the keyboard, operator (the operation button or operation key), or the like is connected and an operation signal according to the operation is formed and supplied to the CPU 601. The I/O controller 609 outputs information from an output terminal on the basis of an instruction from the CPU 601. Or, when information is inputted from the input terminal, the I/O controller 609 supplies the information to the CPU 601.

Figure 7:
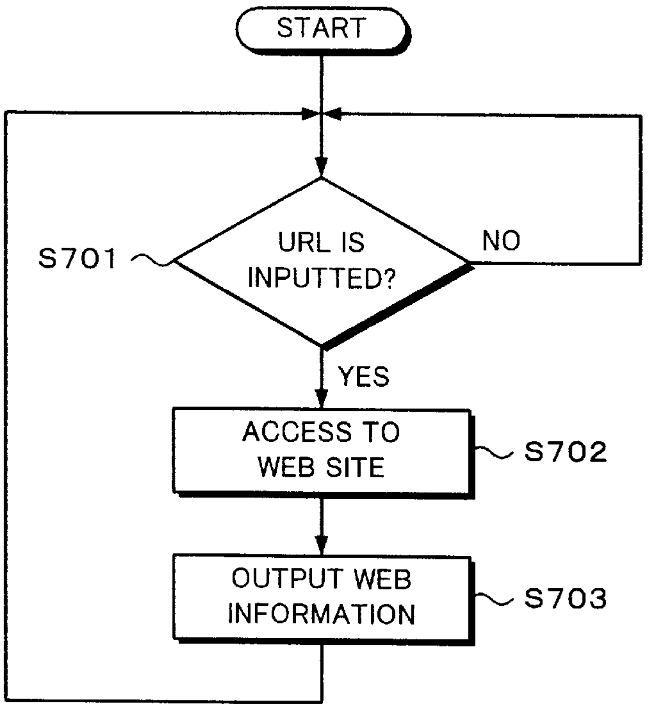
FIG. 7 is a flowchart showing an embodiment of a processing procedure of an information processing apparatus of the audio URL signal receiving apparatus to which the invention is applied.

A processing procedure of the information processing unit, namely, processes which are executed by the audio URL signal receiving apparatus according to the invention will now be described with reference to a flowchart of FIG. 7. In step S701, a check is made to see if the URL has been inputted from the decoder. When the URL is inputted, the control is shifted to step S702. When the URL is not inputted, the control is returned to step S701. That is, the control remains in step S701 until the URL is inputted. In step S702, the web site shown by the inputted URL is accessed through a network line, the web information is captured, and the control is shifted to step S703. In step S703, the web information is outputted and the control is returned to step S701.

By using the above processing procedure, when the audio URL signal is extracted from the received audio signal, the audio URL signal receiving apparatus according to the invention immediately accesses to the web site shown by the URL through the telephone line, thereby outputting the captured web information.

By combining the foregoing means, apparatuses, and processing procedure, the audio URL signal receiving apparatus for extracting the URL from the received audio signal and accessing to the web site shown by the URL can be realized.

By using the audio URL signal transmitting apparatus and audio URL signal receiving apparatus according to the invention mentioned above, the audio URL signal transmitting and receiving system for making the access to the web site easy can be realized.

It will be obviously understood that the audio URL signal transmitting and receiving system according to the invention can be also applied to any system which can transmit and receive an audio signal.

Figure 8:
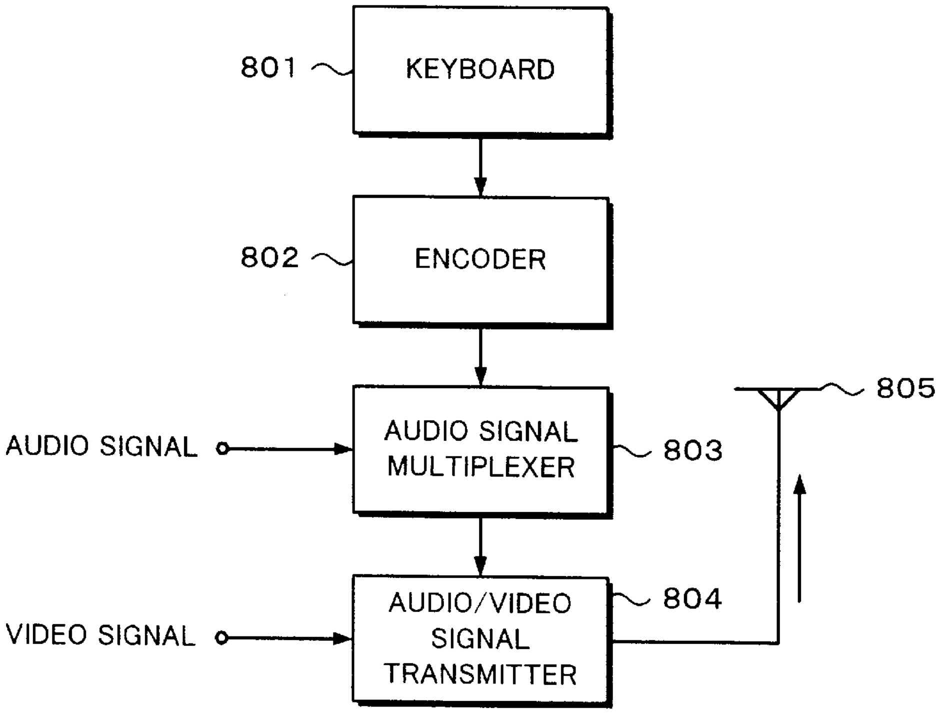
FIG. 8 is a block diagram of a modification in which the audio URL signal transmitting apparatus to which the invention is applied is applied to a television transmitting apparatus.

An embodiment in which the audio URL signal transmitting and receiving system according to the invention is applied to a television broadcasting will now be described with reference to the preferred drawings. FIG. 8 shows a modification in which the audio URL signal transmitting apparatus according to the invention is applied to a television transmitting apparatus. A keyboard 801 serving as a URL input unit supplies a URL to be transmitted to an encoder 802. The encoder 802 supplies an audio URL signal to an audio signal multiplexer 803 on the basis of the URL from the keyboard 801. The audio signal multiplexer 803 multiplexes the audio URL signal supplied from the encoder 802 to an audio signal which is supplied from an input terminal and supplies the multiplexed signal to an audio/video signal transmitter 804. The audio/video signal transmitter 804 transmits the audio signal to which the audio URL signal has been multiplexed through a transmitting antenna 805 together with a video signal which is inputted from the input terminal.

By combining the means and apparatuses as mentioned above, the television transmitting apparatus having the audio URL signal transmitting function according to the invention can be realized.

Figure 9:
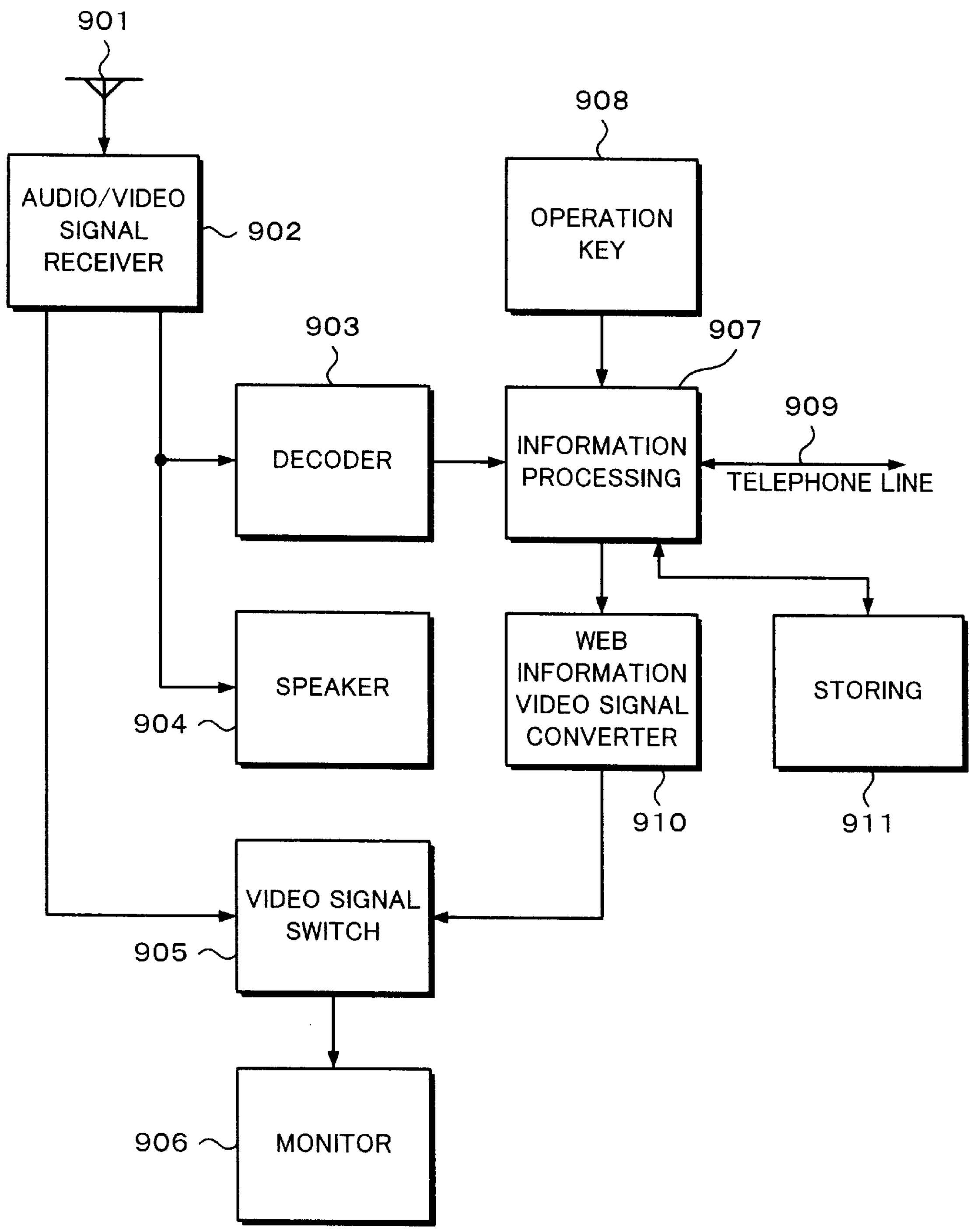
FIG. 9 is a block diagram of a modification in which the audio URL signal receiving apparatus to which the invention is applied is applied to a television receiving apparatus.

FIG. 9 shows a modification in which the audio URL signal receiving apparatus according to the invention is applied to a television receiving apparatus. In the modification, the web information is outputted by using a web information video signal converter and a monitor and the monitor is commonly used as a monitor which functions as a video signal output unit. As a network line, any line can be used so long as it can access to the web site. Explanation will be made here with respect to an apparatus for accessing to the web site through a telephone line.

An audio/video signal receiver 902 demodulates a video signal and an audio signal from a radio wave captured by a receiving antenna 901, supplies the video signal to a video signal switch 905, and supplies the audio signal to a decoder 903 and a speaker 904 as an audio signal output unit. The decoder 903 extracts an audio URL signal corresponding to the URL in a one-to-one corresponding manner from the audio signal from the audio/video signal receiver 902, thereby deciding the transmitted URL and supplying the URL to an information processing unit 907. The speaker 904 generates the audio signal supplied from the audio/video signal receiver 902.

In accordance with a predetermined procedure, the information processing unit 907 accesses through a telephone line 909 to the web site shown by the URL which is supplied from the decoder 903, captures web information, and supplies the web information to a web information video signal converter 910 in response to a command from an operation key 908 as a command input unit. Or, the information processing unit 907 writes the URL into a storing unit 911 or reads out the URL from the storing unit 911 as necessary.

The storing unit 911 stores the URL supplied from the information processing unit 907 or supplies the stored URL to the information processing unit 907. The operation key 908 as a command input unit supplies a command to the information processing unit 907. The web information video signal converter 910 converts the web information which is supplied from the information processing unit 907 to a video signal and supplies to the video signal switch 905.

The video signal switch 905 supplies either one or both of the video signal which is supplied from the audio/video signal receiver 902 and the video signal which is supplied from the web information video signal converter 910 to a monitor 906 serving as video signal output means. The monitor 906 outputs the video signal which is supplied from the video signal switch 905.

A processing procedure of the information processing unit 907, namely, a processing procedure of the television receiving apparatus according to the invention will now be described with reference to a flowchart of FIG. 10. In step S1001, whether the URL has been inputted from the decoder or not is discriminated. When the URL is inputted, the control is shifted to step S1002. When the URL is not inputted, the control is returned to step S1001. That is, the control remains in step S1001 until the URL is inputted.

In step S1002, the apparatus accesses through the telephone line to the web site shown by the inputted URL and captures the web information. The control is shifted to step S1003. In step S1003, the web information is displayed on the monitor and the control is shifted to step S1004. In step S1004, a check is made to see if a command to finish the display has arrived. When the display end command reaches, the control is shifted to step S1005. When it is not inputted, the control is returned to step S1004. That is, the control remains in step S1004 until the display end command arrives. In step S1005, the display of the web information is finished and the control is returned to step S1001.

By using the above processing procedure, the television receiving apparatus according to the invention can realize the function such that when the audio URL signal is extracted from the received audio signal, the web site shown by the URL is immediately accessed through the telephone line and the captured web information is displayed on the monitor until the user generates the display end command.

By combining the foregoing means, apparatuses, and processing procedure, the television receiving apparatus having the audio URL signal receiving function according to the invention can be realized.

By using the television transmitting apparatus having the audio URL signal transmitting function and the television receiving apparatus having the audio URL signal receiving function according to the invention, the audio URL signal transmitting and receiving system according to the invention can be applied to the television broadcasting.

Although the method of applying the transmission and reception of the audio URL signal to the video/audio signal transmitting and receiving system, namely, the television broadcasting has been described as an example, it will be obviously understood that the transmission and reception of the video signal are not indispensable for the transmission and reception of the audio URL signal.

Although the apparatus in which the audio URL signal receiving function is provided for the television receiver has been described as an audio URL signal receiving apparatus, it will be obviously understood that the above apparatus can be also realized as software to realize the foregoing processing procedure that is applied to a personal computer having both of the audio signal receiving function and the function for accessing to the web site and displaying the web information.

Figure 11:
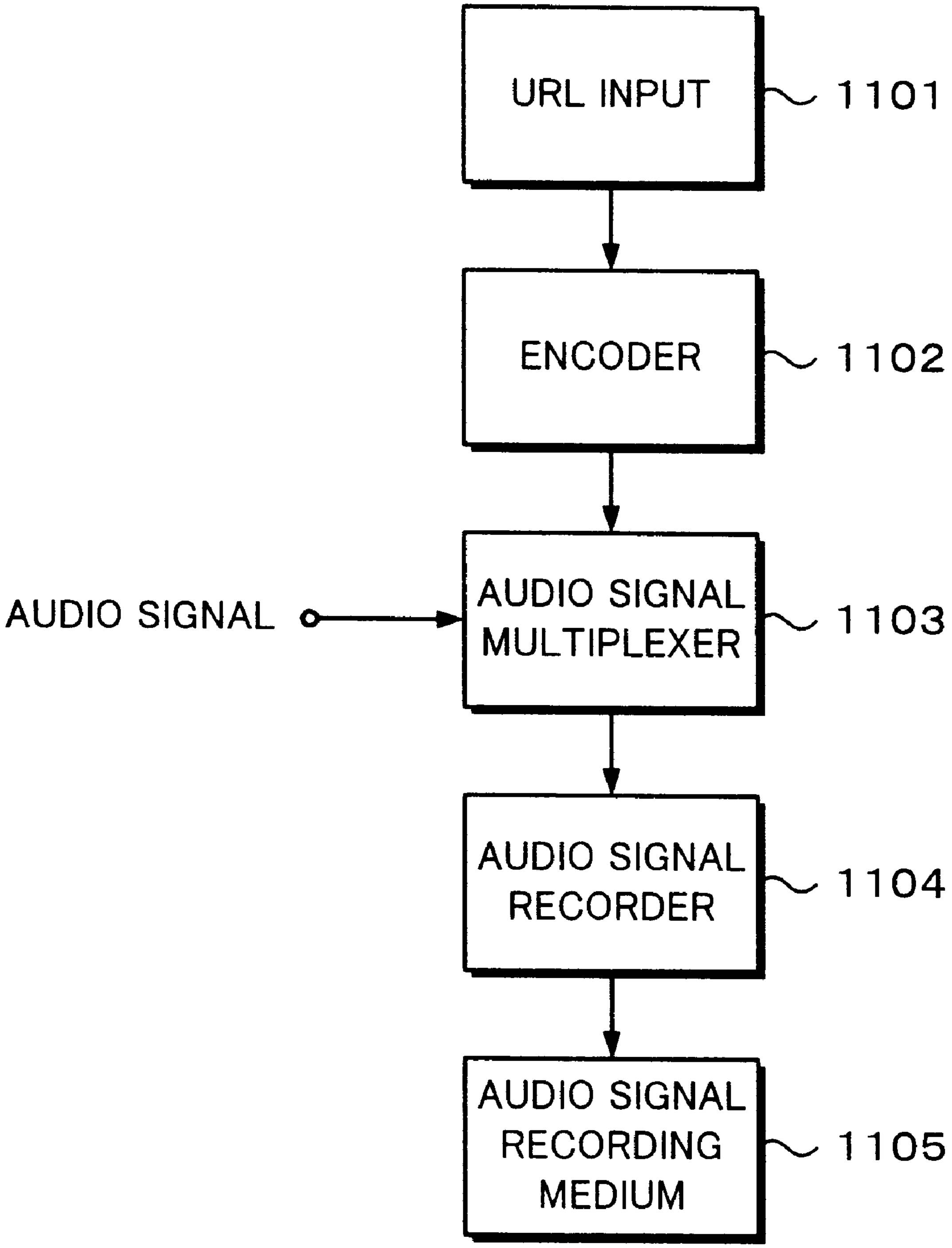
FIG. 11 is a block diagram of an embodiment of an audio URL signal recording apparatus to which the invention is applied.

An audio URL signal recording and reproducing system which is applied to the invention will now be described in detail with reference to the drawings. FIG. 11 shows an embodiment of an audio URL signal recording apparatus to which the invention is applied. A URL input unit 1101 supplies a URL to be transmitted to an encoder 1102. A keyboard can be mentioned as a typical URL input unit. The encoder 1102 supplies the audio URL signal to an audio signal multiplexer 1103 on the basis of the URL from the URL input unit 1101. As an encoder 1102, an encoder similar to the foregoing encoder shown in FIG. 3 can be used.

The audio signal multiplexer 1103 multiplexes an audio URL signal supplied from the encoder 1102 to an audio signal which is supplied from an input terminal and supplies the multiplexed signal to an audio signal recorder 1104. The audio signal recorder 1104 records the audio signal supplied from the audio signal multiplexer 1103 to an audio signal recording medium 1105. A magnetic tape, an optical disk, a memory card, or the like can be mentioned as a typical audio signal recording medium.

By combining the means, apparatuses, and processing procedure as mentioned above, the audio URL signal recording apparatus for recording the URL as an audio signal can be realized.

In the above audio URL signal recording apparatus, although the audio URL signal is multiplexed to the audio signal from the input terminal, a similar effect will be obviously obtained even by a method whereby the audio URL signal and the audio signal from the input terminal are switched at a proper timing and either one of them is recorded in accordance with a predetermined rule so long as the audio URL signal can be separated and extracted from the reproduced audio signal.

If a method whereby the switching which is executed by the audio signal switch is performed in an extremely short time or those signals are switched in accordance with a waveform of the inputted audio signal in this instance is used, for example, it is also possible to construct such that the audio URL signal is purposely made difficult to be listened for the human ears.

Figure 12:
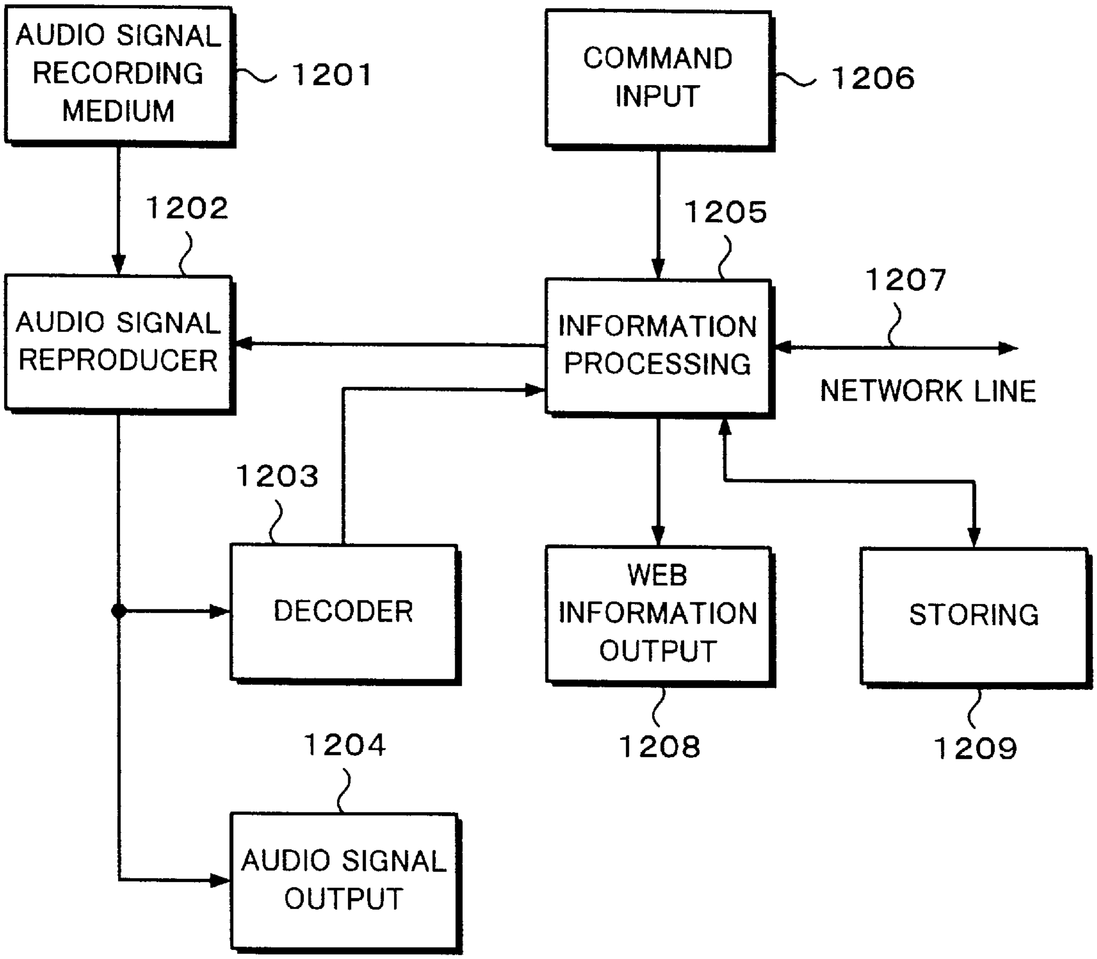
FIG. 12 is a block diagram of an embodiment of an audio URL signal reproducing apparatus to which the invention is applied.

FIG. 12 shows an embodiment of an audio URL signal reproducing apparatus to which the invention is applied. An audio signal reproducer 1202 reproduces an audio signal from an audio signal recording medium 1201 and supplies to a decoder 1203 and an audio signal output unit 1204 by a command from an information processing unit 1205. As a decoder 1203, a decoder similar to the decoder shown in FIG. 5 mentioned above can be used. The decoder 1203 extracts an audio URL signal corresponding to the URL in a one-to-one corresponding manner from the audio signal which is supplied from the audio signal reproducer 1202, thereby deciding the transmitted URL and supplies the URL to the information processing unit 1205. The audio signal output unit 1204 outputs the audio signal supplied from the audio signal reproducer 1202. A speaker can be mentioned as a typical audio signal output unit.

In accordance with a predetermined procedure, the information processing unit 1205 accesses through a network line 1207 to a web site shown by the URL which is supplied from the decoder 1203, captures web information, and supplies the web information to a web information output unit 1208 in response to a command from a command input unit 1206. Or, the information processing unit 1205 writes the URL into a storing unit 1209 or reads out the URL from the storing unit 1209 as necessary. Or, the information processing unit 1205 supplies a command to the audio signal reproducer 1202. A microcomputer can be mentioned as a typical information processing unit.

The storing unit 1209 stores the URL supplied from the information processing unit 1205 or supplies the stored URL to the information processing unit 1205. The command input unit 1206 supplies a command to the information processing unit 1205. An operator (an operation button, an operation key) can be mentioned as typical command input means. The web information output unit 1208 outputs the web information which is supplied from the information processing unit 1205. A monitor or an output terminal from which the web information is outputted in accordance with a predetermined protocol can be mentioned as a typical web information output unit.

As an information processing unit 1205, a unit similar to the information processing unit shown in FIG. 6 mentioned above can be used. As a processing procedure of the information processing unit 1205, namely, processes which are executed by the URL reproducing apparatus according to the invention, those similar to the processes shown in FIG. 7 mentioned above can be used.

By combining the means, apparatuses, and processing procedure as mentioned above, the audio URL signal reproducing apparatus for extracting the URL from the reproduced audio signal and accessing to the web site shown by the URL can be realized.

By using the audio URL signal recording apparatus and audio URL signal reproducing apparatus according to the invention, the audio URL signal recording and reproducing system which makes the access to the web site easy can be realized.

It will be obviously understood that the audio URL signal recording and reproducing system according to the invention can be applied to any system so long as it can record and reproduce an audio signal. That is, a similar effect can be obviously obtained even if any audio signal recording medium is used.

As an embodiment of the audio URL signal recording and reproducing system according to the invention, an audio URL signal recording and reproducing system using an optical disk as an audio signal recording medium (hereinafter, such a system is referred to as an optical disk recording and reproducing system) will now be described.

Figure 13:
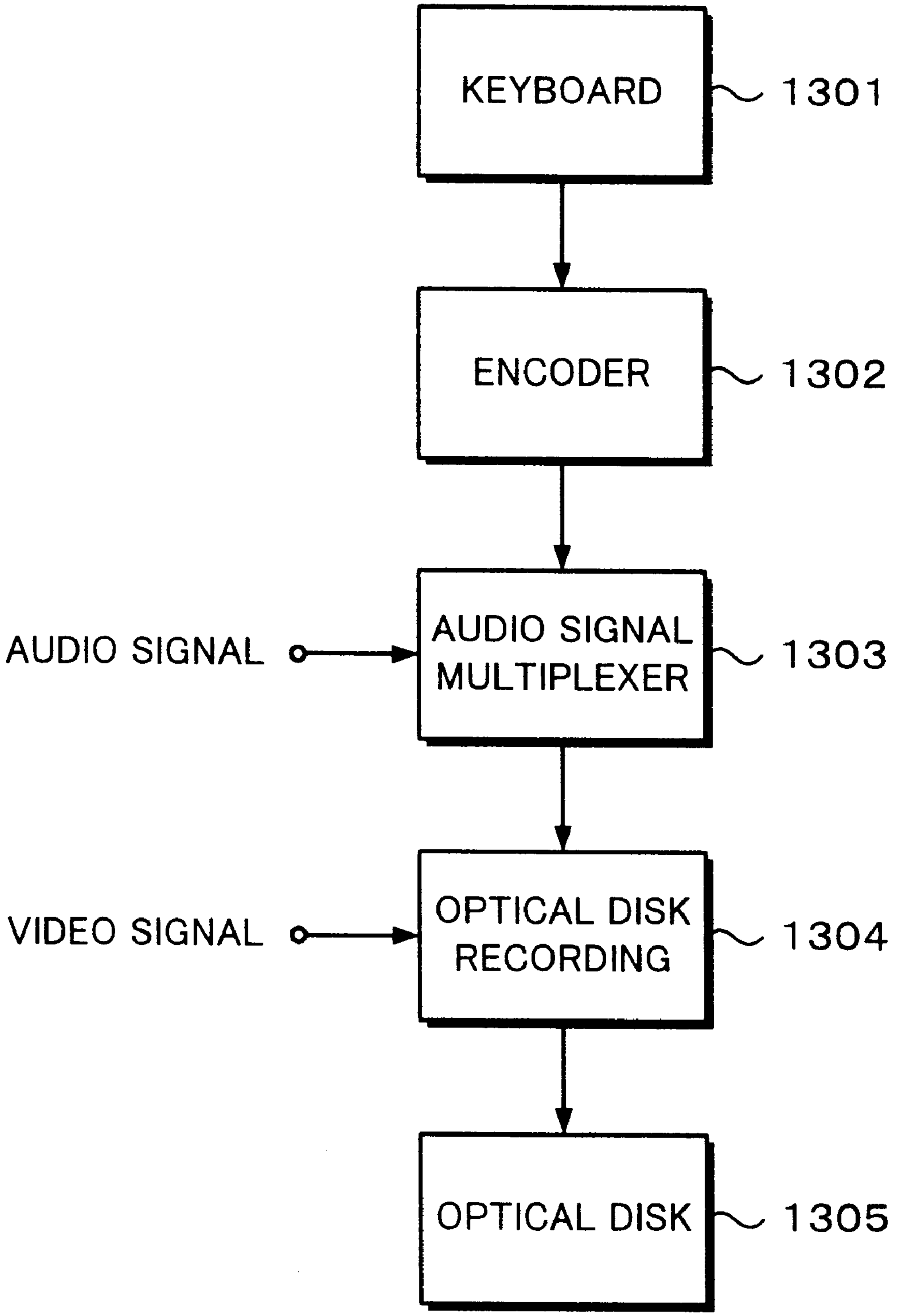
FIG. 13 is a block diagram of an example in which the audio URL signal recording apparatus which is applied to the invention is applied to an optical disk recorder.

FIG. 13 shows an embodiment in which the audio URL signal recording apparatus according to the invention is applied to an optical disk recording apparatus. A keyboard 1301 as a URL input unit supplies a URL to be transmitted to an encoder 1302. The encoder 1302 supplies the audio URL signal to an audio signal multiplexer 1303 on the basis of the URL from the keyboard 1301. The audio signal multiplexer 1303 multiplexes the audio URL signal supplied from the encoder 1302 to an audio signal which is supplied from an input terminal and supplies the multiplexed signal to an optical disk recording unit 1304. The optical disk recording unit 1304 records the audio signal supplied from the audio signal multiplexer 1303 to an optical disk 1305.

By combining the means and apparatuses as mentioned above, the optical disk recording apparatus having the audio URL signal recording function according to the invention can be realized.

Figure 14:
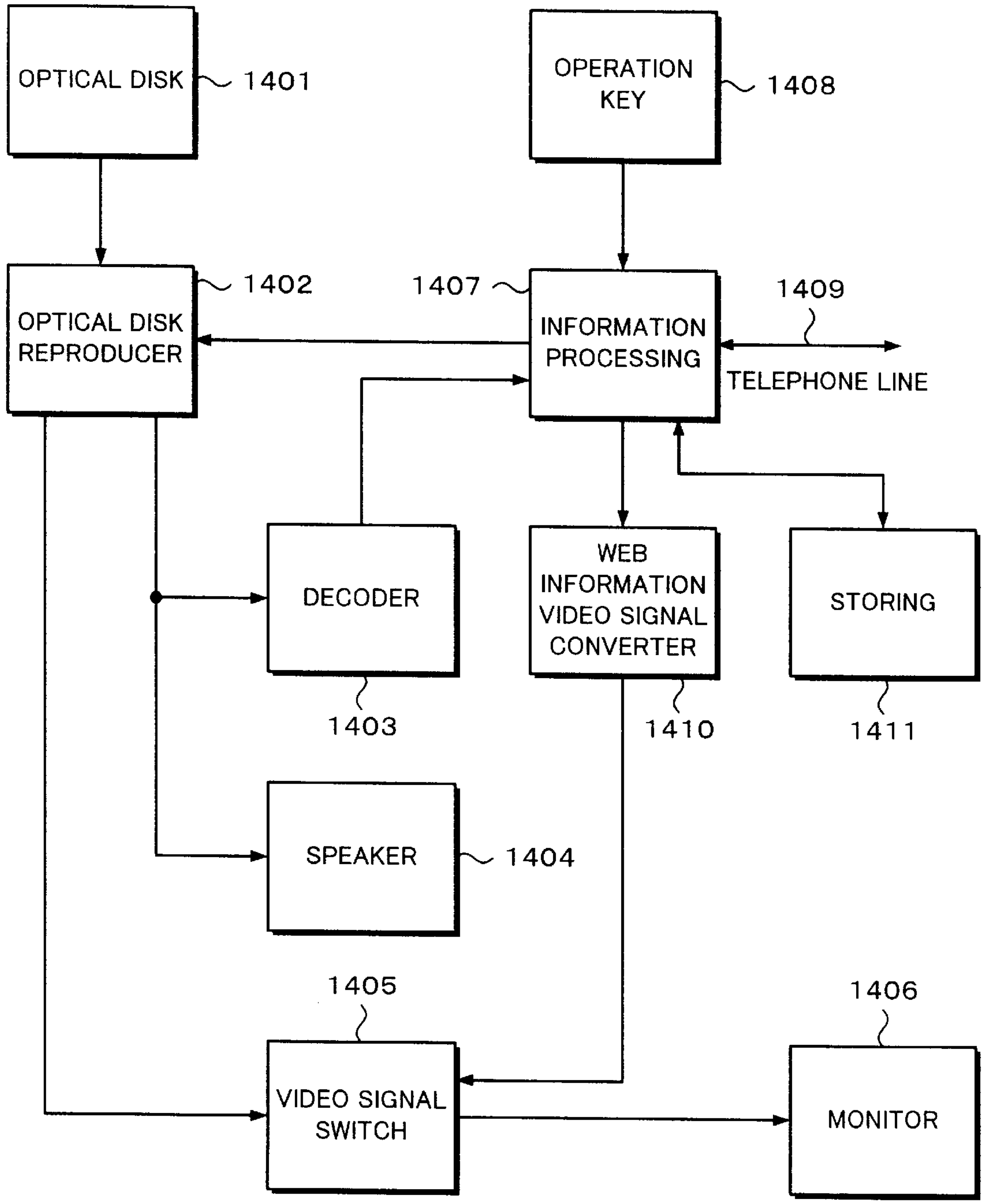
FIG. 14 is a block diagram of an example in which the audio URL signal reproducing apparatus which is applied to the invention is applied to an optical disk reproducer.

FIG. 14 shows an embodiment in which the audio URL signal reproducing apparatus according to the invention is applied to an optical disk reproducing apparatus. Web information is outputted by using a web information video signal converter and a monitor. The monitor is commonly used as a monitor which functions as a video signal output unit. As a network line, any line can be used so long as it can access to the web site. However, an apparatus for accessing to the web site through the telephone line will be described.

An optical disk reproducer 1402 reproduces a video signal and an audio signal from an optical disk 1401 by a command from an information processing unit 1407, supplies the video signal to a video signal switch 1405, and supplies the audio signal to a decoder 1403 and a speaker 1404 serving as an audio signal output unit. The decoder 1403 extracts the audio URL signal corresponding to the URL in a one-to-one corresponding manner from the audio signal from the optical disk reproducer 1402, thereby deciding the transmitted URL and supplying the URL to the information processing unit 1407. The speaker 1404 generates the audio signal supplied from the optical disk reproducer 1402.

In accordance with a predetermined procedure, the information processing unit 1407 accesses through a telephone line 1409 to a web site shown by the URL which is supplied from the decoder 1403, obtains web information, and supplies the web information to a web information video signal converter 1410 in response to a command from an operation key 1408 serving as a command input apparatus. Or, the information processing unit 1407 writes the URL into a storing unit 1411 or reads out the URL from the storing unit 1411 as necessary. Or, the information processing unit 1407 supplies a command to the optical disk reproducer 1402.

The storing unit 1411 stores the URL supplied from the information processing unit 1407 or supplies the stored URL to the information processing unit 1407. The operation key 1408 as command input means supplies a command to the information processing unit 1407. The web information video signal converter 1410 converts the web information which is supplied from the information processing unit 1407 to a video signal and supplies to the video signal switch 1405.

The video signal switch 1405 supplies either one or both of the video signal which is supplied from the optical disk reproducer 1402 and the video signal which is supplied from the web information video signal converter 1410 to a monitor 1406 as a video signal output unit. The monitor 1406 generates the video signal which is supplied from the video signal switch 1405. As a processing procedure of the information processing unit 1407, namely, a processing procedure of the optical disk reproducer according to the invention, a processing procedure similar to that described in FIG. 11 can be used.

By combining the means, apparatuses, and processing procedure as mentioned above, the optical disk reproducing apparatus having the audio URL signal reproducing function according to the invention can be realized.

By using the optical disk recording apparatus having the audio URL signal recording function and the optical disk reproducing apparatus having the audio URL signal reproducing function according to the invention as mentioned above, the audio URL signal recording and reproducing system according to the invention can be applied to the optical disk recording and reproducing system.

Figure 10:
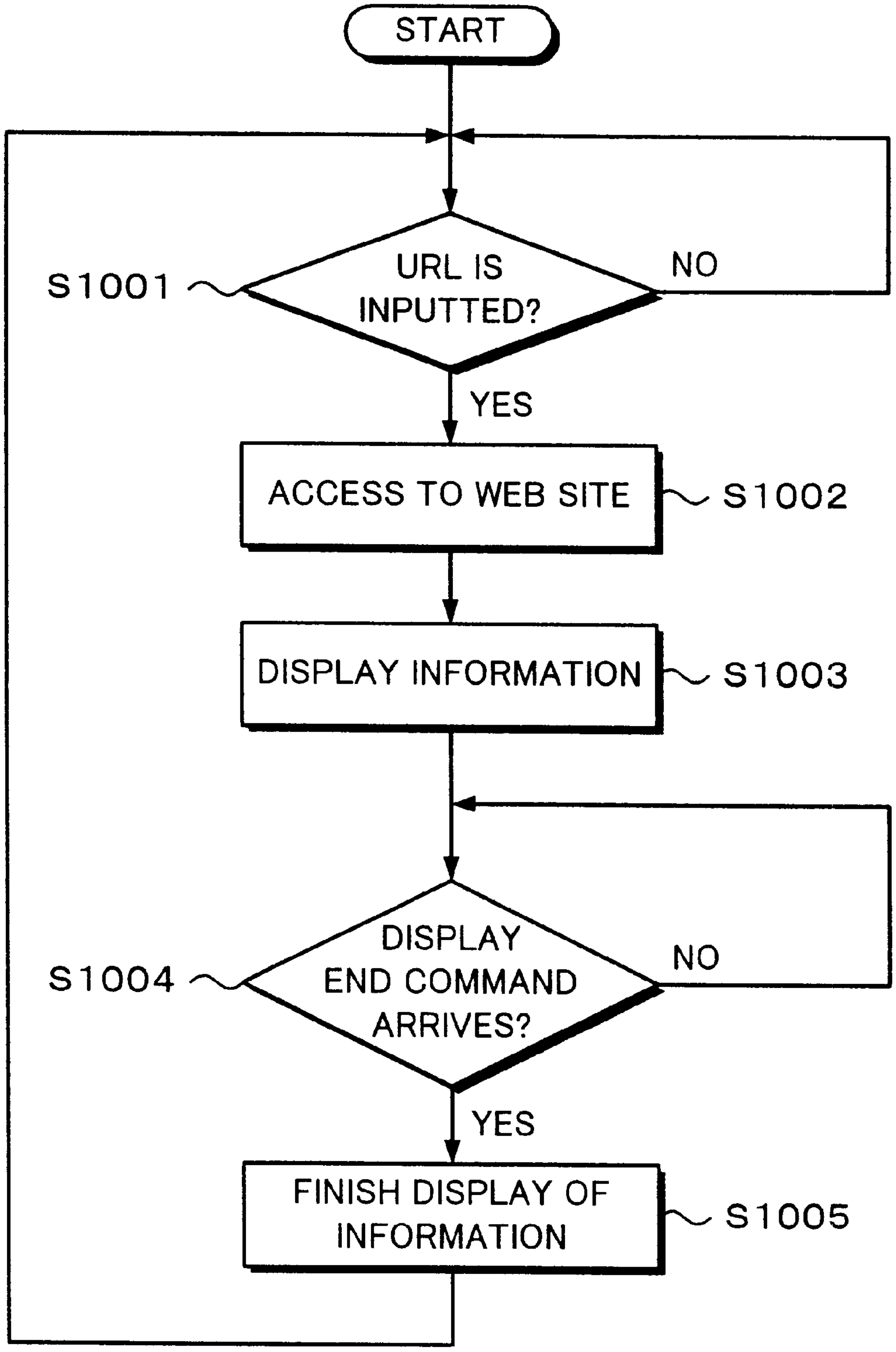
FIG. 10 is a flowchart showing a modification of a processing procedure of an information processing unit of an optical disk reproducing apparatus to which the invention is applied.

If the processing procedure shown in FIG. 10 is used, when the audio URL signal is extracted, the web information of the web site shown by the URL is displayed irrespective of a desire of the user. To solve this problem, it is sufficient to have a function such that when the audio URL signal is extracted, the URL is stored into the storing unit and the web information is displayed for the first time only when there is a command from the user.

In case of realizing those functions, unless there is any function to erase the URL stored in the storing unit, when a new URL is obtained, it cannot be stored. To solve this problem, it is sufficient to have a function to erase the URL from the storing unit when a predetermined time elapses after the URL was stored in the storing unit.

In case of realizing those functions, it is difficult for the user to discriminate whether the URL has been stored in the storing unit or not. To solve the above problem, for a period of time during which the URL is stored into the storing unit, it is sufficient to notify the monitor of a message showing that the URL has been obtained, thereby informing the user of such a fact. As a specific example of the message to notify of the capture of the URL, a method whereby a characteristic figure or logo showing such a notification is multiplexed to a video image and a resultant video image is outputted from the monitor can be mentioned.

That is, when seeing from the user, "If a web information display command is supplied to the apparatus for a period of time during which the URL capture is notified, the web information of the web site shown by the URL can be displayed".

A processing procedure for realizing the function for displaying the information of the web site shown by the URL only when the display command is issued from the user for the first time, the function to erase the URL from the storing unit when a predetermined time elapses after the URL was stored in the storing unit, and the function for notifying of the capture of the URL in the case where the URL has been stored in the storing unit will now be described with reference to a flowchart of FIG. 15.

In step S1501, whether the URL has been inputted from the decoder or not is discriminated. When the URL is inputted, the control is shifted to step S1502. When the URL is not inputted, the control is returned to step S1501. That is, the control remains in step S1501 until the URL is inputted. The inputted URL is written into the storing unit in step S1502. The control is shifted to step S1503. In step S1503, the message indicative of the capture of the URL is displayed on the monitor. The control is shifted to step S1504.

In step S1504, whether a command to display the web information has reached or not is discriminated. When the web information display command reaches, the control is shifted to step S1505. If it is not inputted, the control is shifted to step S1511. In step S1505, the notification of the capture of the URL is finished and the control is shifted to step S1506. In step S1506, the URL is read out from the storing unit. The control is shifted to step S1507. In step S1507, the apparatus accesses through the telephone line to the web site shown by the URL and captures the web information. The control is shifted to step S1508.

In step S1508, the information is displayed on the monitor and the control is shifted to step S1509. In step S1509, a check is made to see if a command to finish the display of the web information has reached. When the command to finish the display of the web information arrives, the control is shifted to step S1510. If it is not inputted, the control is returned to step S1509. That is, the control remains in step S1509 until the display end command reaches. In step S1510, the display of the web information is finished and the control is shifted to step S1513.

In step S1511, a check is made to see if a predetermined time has elapsed. When the predetermined time elapses, the control is shifted to step S1512. If it does not elapse, the control is returned to step S1504. In step S1512, the notification of the capture of the URL is finished. The control is shifted to step S1513. In step S1513, the stored URL is erased from the storing unit and the control is returned to step S1501.

By using the processing procedure as mentioned above, it is possible to realize the function to display the information of the web site shown by the URL to the television receiving apparatus or optical disk reproducing apparatus according to the invention for the first time only when the display command is issued from the user, the function to erase the URL from the storing unit when a predetermined time elapses after the URL was stored into the storing unit, and the function to notify of the capture of the URL in the case where the URL has been stored in the storing unit.

That is, when the audio URL signal is extracted from the received or reproduced audio signal, the URL is first stored into the storing unit, a fact that the URL was captured is notified to the user for a predetermined time. If the user supplies the display command of the web information to the apparatus while the capture of the URL is notified, the apparatus immediately accesses to the web site through the telephone line and displays the captured web information to the monitor until the user supplies the display end command. The URL is erased from the storing unit together with the end of the display of the web information. Unless the user supplies the display command of the web information to the apparatus while the capture of the URL is notified, the notification of the URL capture is finished and the URL is erased from the storing unit.

Figure 15:
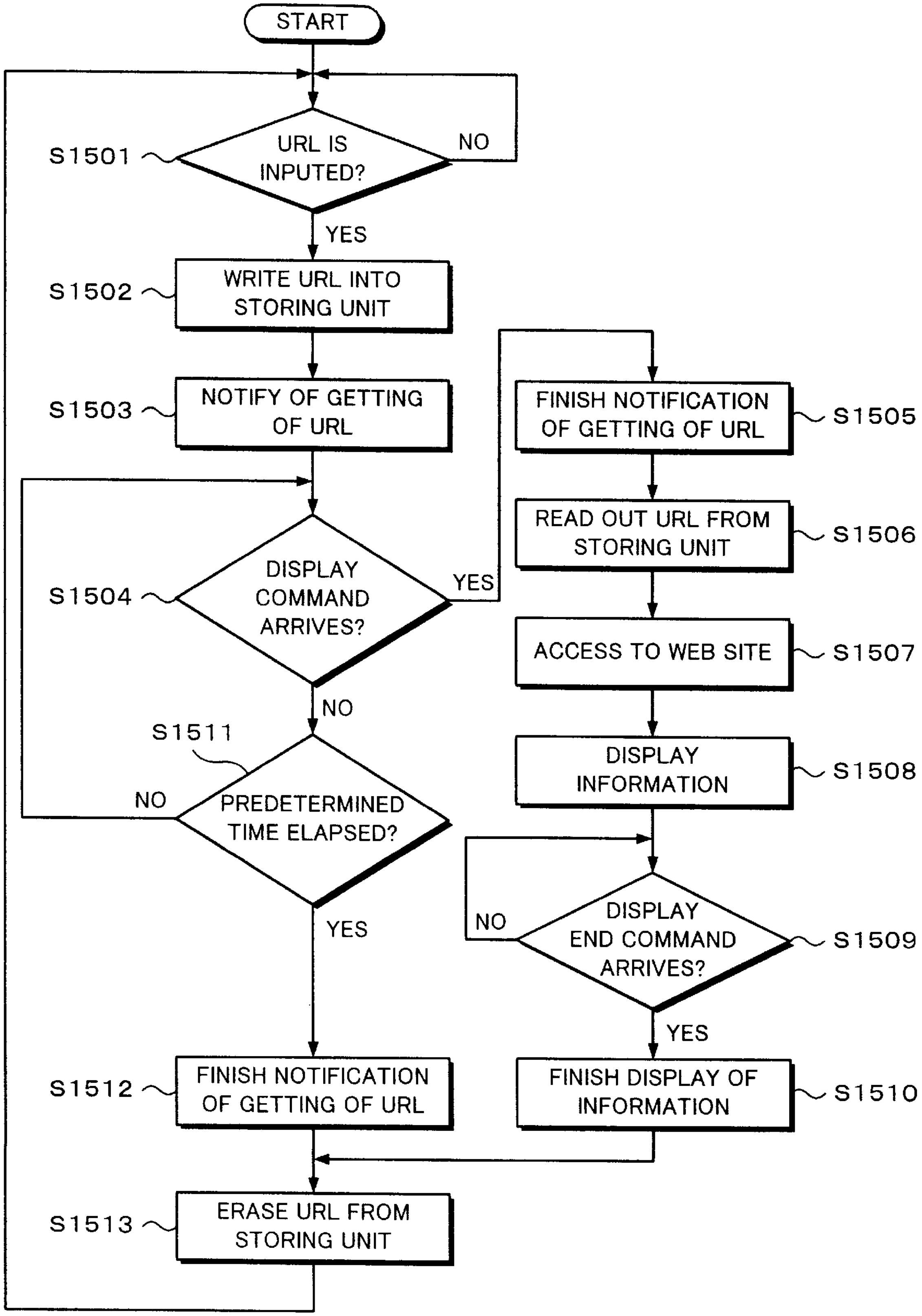
FIG. 15 is a flowchart showing an example of a processing procedure of an information processing unit of an optical disk reproducing apparatus which is applied to the invention.

If the processing procedure shown in FIG. 15 is used, unless the display command is supplied for the predetermined time after the audio URL signal was extracted, the captured URL is lost. Therefore, unless the user always operates the apparatus, the information of the web site shown by the obtained URL cannot be displayed.

To solve this problem, it is sufficient to have a function such that when the audio URL signal is extracted, a plurality of URLs are stored into the storing unit and the user selects a desired URL from the URLs stored in the storing unit, thereby accessing to the web site shown by the selected URL and displaying the web information.

However, if those functions are realized, many URLs are stored into the storing unit and it will be obviously understood that even if a new URL is received, it cannot be stored. To solve this problem, it is sufficient to have a function such that in the case where there is no storage space in the storing unit, the URL which was stored earliest with respect to the time is erased and the newly received URL is stored there.

Figure 16:
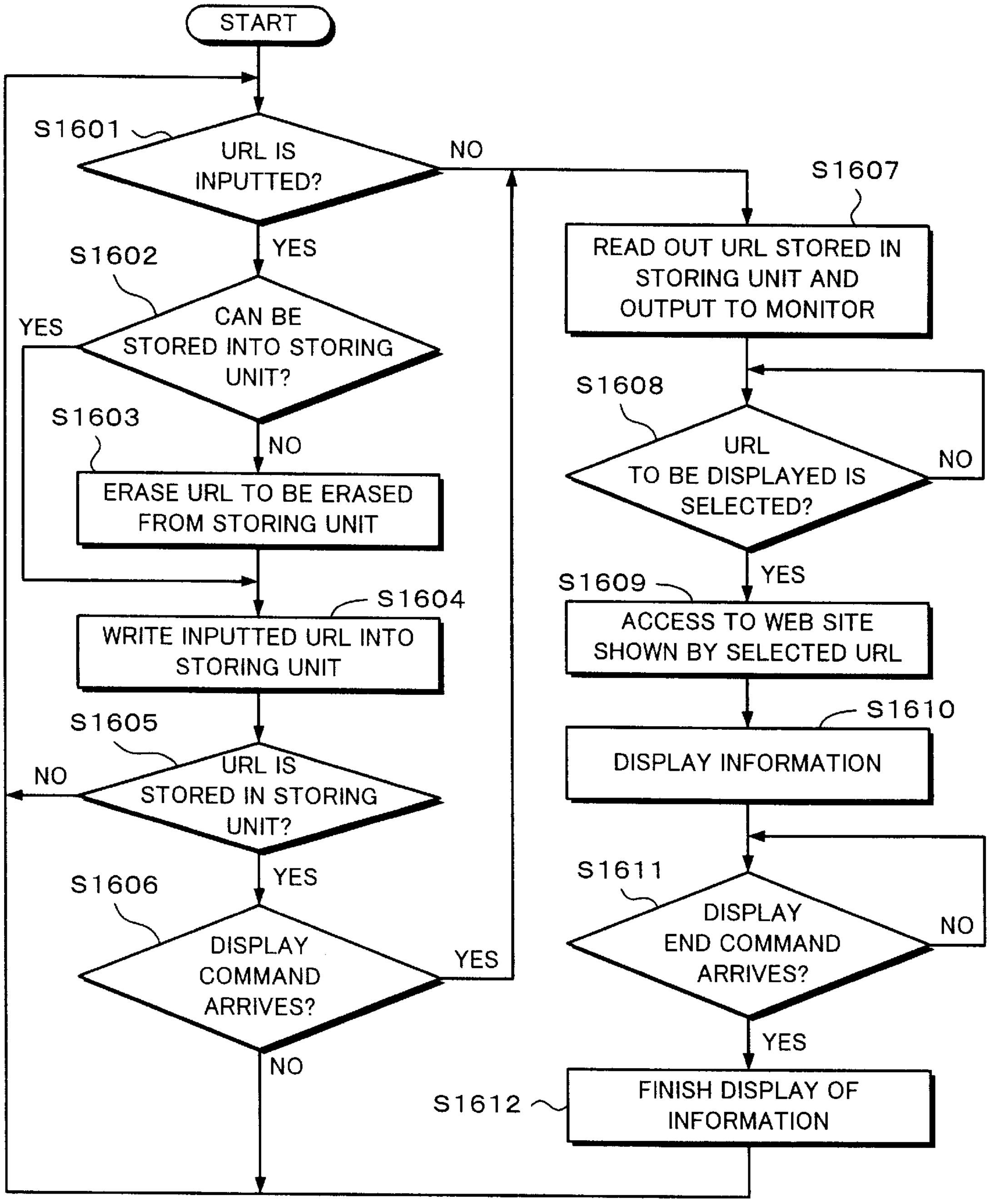
FIG. 16 is a flowchart showing another example of a processing procedure of the information processing unit of the optical disk reproducing apparatus which is applied to the invention.

A processing procedure having the function for enabling a plurality of obtained URLs to be stored into the storing unit and selecting a desired one of the plurality of URLs stored in the storing unit by the user, thereby displaying the information of the web site shown by the URL and the function for erasing the URL which was stored earliest with respect to the time in the case where there is no storage space in the storing unit and storing the newly obtained URL into the erased area will now be described with reference to a flowchart of FIG. 16.

In step S1601, a check is made to see if the URL has been inputted from the decoder. When the URL is inputted, the control is shifted to step S1602. When the URL is not inputted, the control is shifted to step S1607. In step S1602, a check is made to see if a storage space exists in the storing unit. If the URL can be stored, the control is shifted to step S1604. If there is no storage space, the control is shifted to step S1603. In step S1603, the URL which was stored earliest with respect to the time is erased from the storing unit and the control is shifted to step S1604.

In step S1604, the inputted URL is stored into the storing unit and the control is shifted to step S1605. In step S1605, a check is made to see if the URL has been stored in the storing unit. If YES, the control is shifted to step S1605. If the URL is not stored, the control is returned to step S1601. In step S1606, a check is made to see if a command to display the web site shown by the inputted URL has reached. When the command to display the web site arrives, the control is shifted to step S1607. If the display command is not inputted, the control is returned to step S1601.

In step S1607, the URL stored in the storing unit is read out and displayed on the monitor so as to allow the user to select. The control is shifted to step S1608. In step S1608, a check is made to see if the user has selected the desired URL. If the URL has already been selected, the control is shifted to step S1609. If the URL is not selected yet, the control is returned to step S1608. That is, the control remains in step S1608 until the user selects the desired URL.

In step S1609, the apparatus accesses through the telephone line to the web site shown by the selected URL which is desired by the user and captures the web information. The control is shifted to step S1610. In step S1610, the information is displayed on the monitor and the control is shifted to step S1611. In step S1611, a check is made to see if the command to finish the display has reached. If the display end command arrives, the control is shifted to step S1612. If it is not inputted, the control is returned to step S1611. That is, the control remains in step S1611 until the display end command arrives. In step S1612, the display of the information is finished. The control is returned to step S1601.

By using such a processing procedure, in the television receiving apparatus or optical disk reproducing apparatus according to the invention, it is possible to realize the function for enabling a plurality of obtained URLs to be stored into the storing unit and for displaying the information of the web site shown by the URL by selecting the desired URL by the user and the function for erasing the URL which was stored earliest with respect to the time in the case where there is no storage space in the storing unit and for storing the newly obtained URL into the erased area.

That is, when the audio URL signal is extracted from the received or reproduced audio signal, if there is no storage space in the storing unit, the URL which was stored earliest with respect to the time is first erased and the newly obtained URL is stored into the storing unit. When the user supplies the display command of the web information to the apparatus, the stored URLs are displayed on the monitor and the user selects one desired URL from the displayed URLs, thereby accessing through the telephone line to the web site shown by the selected URL and capturing the web information. The web information is displayed on the monitor until the user supplies the display end command.

The method of taking a countermeasure for the process in the case where there is no storage space in the storing unit which can store a plurality of URLs has been described here. However, it will be obviously understood that by providing the function for erasing the URL from the storing unit when a predetermined time elapses after the URL was stored in the storing unit, there is an effect of reduction in occurrence frequency of a situation such that there is no storage space in the storing unit.

According to any one of the processing procedures of the apparatus described so far, only the URL is stored in the storing unit and, after the information display command from the user was inputted, the apparatus accesses through the telephone line to the web site shown by the URL and the web information is displayed. However, since the line is often busy, it will be easily presumed that there is a case where fairly long time is required until the apparatus accesses to the web site shown by the URL after the user inputted the information display command.

To solve this problem, it is sufficient to provide the function such that when the audio URL signal is extracted from the received or reproduced audio signal, not only the URL is stored into the storing unit but also the apparatus immediately accesses to the web site shown by the URL, the web information is obtained, the web information is also stored in the storing unit, and when the display command from the user is inputted, the web information stored in the storing unit is read out and displayed.

Figure 17:
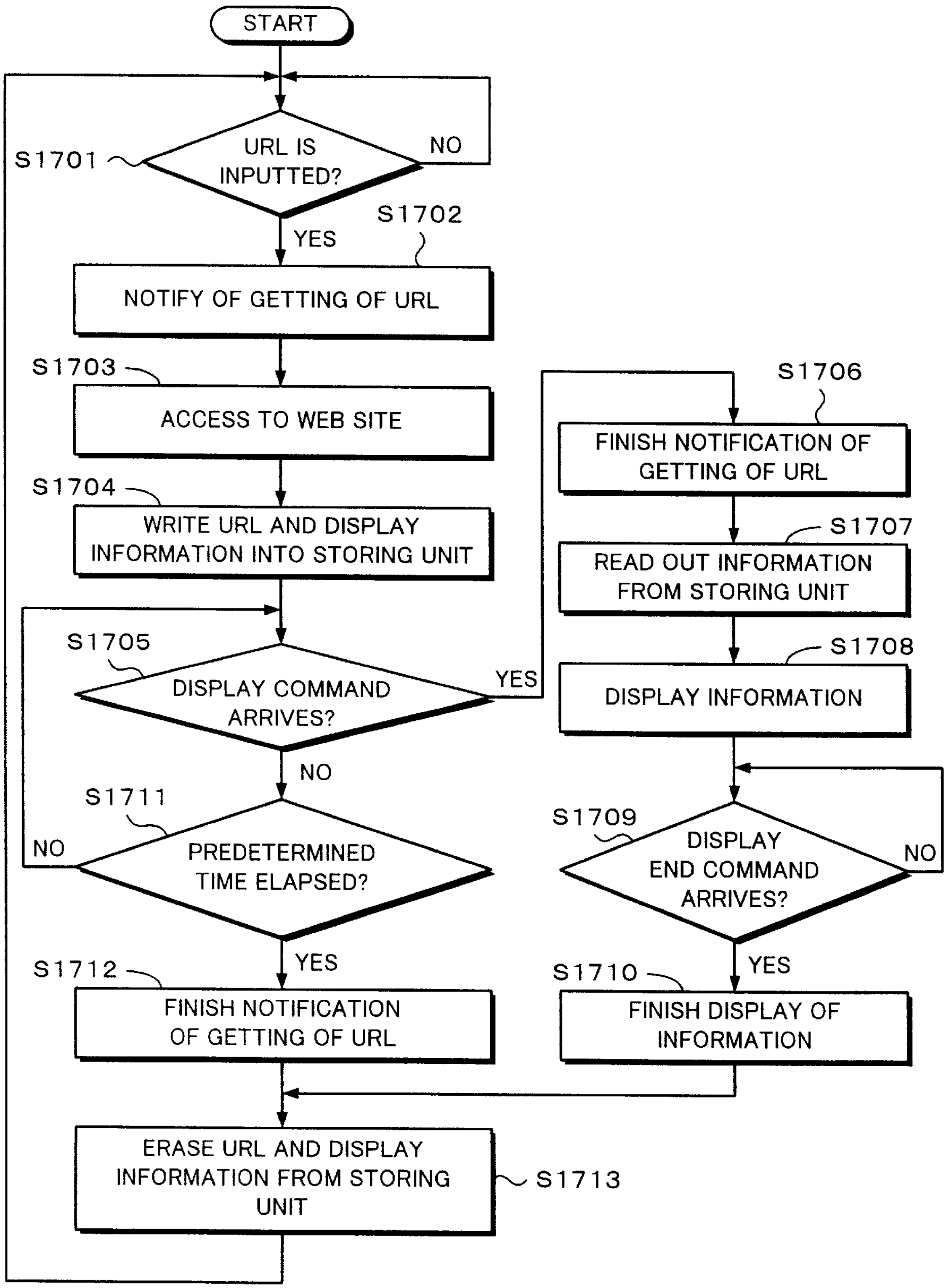
FIG. 17 is a flowchart showing further another example of a processing procedure of the information processing unit of the optical disk reproducing apparatus which is applied to the invention.

The processing procedure having the above functions will now be described with reference to a flowchart of FIG. 17. In step S1701, whether the URL has been inputted from the decoder or not is discriminated. When the URL is inputted, the control is shifted to step S1702. When the URL is not inputted, the control is returned to step S1701. That is, the control remains in step S1701 until the URL is inputted. In step S1702, the capture of the URL is notified on the monitor and the control is shifted to step S1703.

In step S1703, the apparatus accesses through the telephone line to the web site shown by the URL and the web information is captured. The control is shifted to step S1704. In step S1704, the URL and the web information are written into the storing unit and the control is shifted to step S1705. In step S1705, a check is made to see if a command to display the web site shown by the inputted URL has reached. When the display command arrives, the control is shifted to step S1706. When the display command is not inputted, the control is shifted to step S1710.

In step S1706, the notification of the capture of the URL is finished and the control is shifted to step S1707. In step S1707, the web information is read out from the storing unit and the control is shifted to step S1708. In step S1708, the web information is displayed on the monitor and the control is shifted to step S1709. In step S1709, a check is made to see if a command to finish the display of the web information has reached. When the display end command arrives, the control is shifted to step S1710. When the display end command is not inputted, the control is returned to step S1709. That is, the control remains in step S1709 until the display end command reaches. In step S1710, the display of the web information is finished and the control is shifted to step S1713.

In step S1711, a check is made to see if the predetermined time has elapsed. When the predetermined time elapses, the control is shifted to step S1712. If NO, the control is returned to step S1705. In step S1712, the notification of the URL capture is finished and the control is shifted to step S1713. In step S1713, the stored URL and web information are erased from the storing unit and the control is returned to step S1701.

By using the above processing procedure, in the television receiving apparatus or optical disk reproducing apparatus according to the invention, it is possible to realize the function such that when the audio URL signal is extracted from the received audio signal, not only the URL is stored in the storing unit but also the apparatus immediately accesses to the web site shown by the URL, captures the web information, and stores the URL together with the information into the storing unit, and when the display command of the web information is inputted from the user, the web information stored in the storing unit is read out and displayed.

The above embodiment has been described with respect to the example of the method of applying the recording and reproduction of the audio URL signal to the optical disk recording and reproducing system as a video/audio signal recording and reproducing system. However, it will be obviously understood that the recording and reproduction of the video signal are not indispensable for the recording and reproduction of the audio URL signal.

The above embodiment has been described with respect to the case where the optical disk reproducing apparatus for which the audio URL signal reproducing function is provided is used as an audio URL signal receiving apparatus. However, the apparatus can be also obviously realized as software to realize the processing procedure which has been described so far and is applied to a personal computer having both of the audio signal reproducing function and the function to access to the web site and to display the web information.

The above embodiment has been described with respect to the example in which the audio signal, namely, the signal in the audible band of the human being is used as an audio URL signal. However, it will be obviously understood that a similar effect will be obtained by the invention even in case of using any signal so long as it can be transmitted and received as an audio signal.

According to the invention, to make the access to the web site easy, it is possible to realize the audio URL signal transmitting and receiving system comprising the audio URL signal transmitting apparatus for transmitting the URL as an audio signal and the audio URL signal receiving apparatus for extracting the URL from the received audio signal and accessing to the web site shown by the URL.

According to the invention, to make the access to the web site easy, it is possible to realize the audio URL signal recording and reproducing system comprising the audio URL signal recording apparatus for recording the URL as an audio signal and the audio URL signal reproducing apparatus for extracting the URL from the reproduced audio signal and accessing to the web site shown by the URL.

The present invention is not limited to the foregoing embodiments but many modifications and variations are possible within the spirit and scope of the appended claims of the invention.

What is claimed is:

1. An audio uniform resource locator signal transmitting apparatus comprising:

a uniform resource locator input for inputting a uniform resource locator to be transmitted;

an encoder for generating an audio uniform resource locator signal by cross-referencing said uniform resource locator in a table of uniform resource locators and corresponding digital representations to determine a digital uniform resource locator corresponding to said uniform resource locator and performing a digital to analog conversion operation on said digital uniform resource locator; and an audio signal transmitter for transmitting the audio uniform resource locator signal generated by said encoder.

2. The apparatus according to claim 1, further comprising:

an audio signal multiplexer for multiplexing said audio uniform resource locator signal generated by said encoder with an externally supplied audio signal; and an audio signal transmitter for modulating the audio signal multiplexed by said audio signal multiplexer.

3. An audio uniform resource locator signal receiving apparatus comprising:

an audio signal input for inputting an audio signal supplied from a receiver; and a decoder for decoding an audio uniform resource locator signal from said audio signal input by performing an analog to digital conversion operation on said audio uniform resource locator signal to generate a digital uniform resource locator and cross-referencing said digital uniform resource locator in a table of uniform resource locators and corresponding digital representations to determine a uniform resource locator corresponding to said digital uniform resource locator.

4. The apparatus according to claim 3, further comprising a receiving antenna for receiving said audio signal.

5. The apparatus according to claim 3, further comprising an audio signal demodulator for demodulating the input audio signal.

6. The apparatus according to claim 3, further comprising an information processor for automatically accessing an on-line site in response to the decoded audio uniform resource locator signal.

7. The apparatus according to claim 6, further comprising a command input for inputting a user command; wherein said information processor, in response to said user command, automatically accesses the on-line site.

8. The apparatus according to claim 7, further comprising a storage device for storing information acquired from said on-line site accessed by said information processor.

9. The apparatus according to claim 4, wherein the received signal is received from a television transmitter which transmits said audio uniform resource locator signal as a television signal.

10. The apparatus according to claim 1, further comprising a keyboard for inputting said uniform resource locator to be transmitted.

11. The apparatus according to claim 5, further comprising an audio/video signal receiver for demodulating audio/video signals.

12. The apparatus according to claim 8, further comprising a signal converter for converting on-line information supplied from said information processor to a video signal.

13. The apparatus according to claim 12, further comprising a monitor for displaying the video signal.

14. The apparatus according to claim 4, wherein said information processor automatically accesses through a telephone line the on-line site in response to the uniform resource locator.

15. The apparatus according to claim 4, further comprising a storage device for storing in response to a uniform resource locator the audio uniform resource locator signal.

16. The apparatus according to claim 15, further comprising an information processor for erasing the uniform resource locator stored in the storage device after a predetermined time.

17. The apparatus according to claim 4, further comprising an information processor for notifying a user when a uniform resource locator is captured.

18. The apparatus according to claim 14, further comprising a storage device for storing a plurality of stored uniform resource locators; and a selector for selecting one of said plurality of stored uniform resource locators, wherein said information processor automatically accesses through the telephone line the on-line site in response to the selected uniform resource locator and displays information accessed from the on-line site.

19. The apparatus according to claim 18, wherein said information processor erases the uniform resource locator stored earliest in time when a capacity of the storage device is reached.

20. The apparatus according to claim 18, wherein said storage device stores information from said on-line site together with said uniform resource locator.

21. An audio uniform resource locator signal recording apparatus comprising:

a uniform resource locator input for inputting a uniform resource locator;

an encoder for encoding an audio uniform resource locator signal in response to the inputted uniform resource locator by cross-referencing said uniform resource locator in a table of uniform resource locators and corresponding digital representations to determine a digital uniform resource locator corresponding to said uniform resource locator and performing a digital to analog conversion operation on said digital uniform resource locator; and an audio signal recorder for recording said audio uniform resource locator signal to an audio signal recording medium.

22. The apparatus according to claim 21, further comprising an audio signal multiplexer for multiplexing said audio uniform resource locator signal encoded by the encoder with an externally supplied audio signal.

23. An audio uniform resource locator signal reproducing apparatus comprising:

an audio signal reproducer for reproducing an audio signal recorded on an audio signal recording medium; and a decoder for decoding an audio uniform resource locator signal from said reproduced audio signal by performing an analog to digital conversion operation on said audio uniform resource locator signal to generate a digital uniform resource locator and cross-referencing said digital uniform resource locator in a table of uniform resource locators and corresponding digital representations to determine a uniform resource locator corresponding to said digital uniform resource locator.

24. The apparatus according to claim 23, further comprising an information processor for automatically accessing through a network line an on-line site in response to said uniform resource locator.

25. The apparatus according to claim 24, further comprising a storage device for storing information supplied from said information processor and reading out the stored information in response to a user command.

26. The apparatus according to claim 24, wherein said audio signal is recorded on an optical disk along with an externally supplied video signal.

27. The apparatus according to claim 26, further comprising a keyboard for inputting a uniform resource locator.

28. The apparatus according to claim 26, further comprising an optical disk reproducer for reproducing said audio signal and said video signal from said optical disk.

29. The apparatus according to claim 28, further comprising a speaker for outputting said audio signal from the optical disk reproducer.

30. The apparatus according to claim 24, wherein said decoder determines a uniform resource locator from said audio uniform resource locator signal.

31. The apparatus according to claim 24, further comprising an operation key for supplying user commands to said information processor.

32. The apparatus according to claim 24, further comprising an on-line information video signal converter for converting to a video signal information accessed from said on-line site and supplied from said information processor.

33. The apparatus according to claim 28, further comprising a video signal switcher for selecting either video signals supplied by an on-line information video signal converter from information accessed from said on-line site or the video signal supplied from said optical disk reproducer.

34. The apparatus according to claim 33, further comprising a monitor for displaying the video signal supplied from said video signal switcher.

35. The apparatus according to claim 24, wherein said information processor automatically accesses through a telephone line to the on-line site in response to said uniform resource locator.

36. The apparatus according to claim 24, further comprising a storage device for storing said uniform resource locator when said audio uniform resource locator signal is decoded.

37. The apparatus according to claim 24, wherein, when an access command to the on-line site is received, said information processor accesses the on-line site through a telephone line in response to said generated uniform resource locator.

38. The apparatus according to claim 25, wherein said information processor erases the uniform resource locator from said storage device when a predetermined time elapses.

39. The apparatus according to claim 25, wherein said storage device stores, when said audio uniform resource locator signal is decoded, said uniform resource locator.

40. The apparatus according to claim 25, wherein said information processor erases the uniform resource locator and information accessed from said on-line site and stored earliest in time when a capacity of said storage device is reached.

41. The apparatus according to claim 25, wherein when said audio uniform resource locator signal is decoded, said information processor immediately accesses through a telephone line the on-line site represented by the uniform resource locator, captures the information from the on-line site and stores said captured information together with said uniform resource locator in said storage device.

* * * * *